United States Patent
Shirai et al.

(10) Patent No.: US 7,218,384 B2
(45) Date of Patent: May 15, 2007

(54) SURVEYING SYSTEM

(75) Inventors: Masami Shirai, Saitama (JP); Koji Tsuda, Saitama (JP); Atsumi Kaneko, Tokyo (JP); Shinobu Uezono, Saitama (JP); Ryota Ogawa, Saitama (JP)

(73) Assignee: PENTAX Corporation, Tokyo (JP)

( * ) Notice: Subject to any disclaimer, the term of this patent is extended or adjusted under 35 U.S.C. 154(b) by 529 days.

(21) Appl. No.: 10/373,078

(22) Filed: Feb. 26, 2003

(65) Prior Publication Data

US 2003/0160757 A1    Aug. 28, 2003

(30) Foreign Application Priority Data

| Feb. 27, 2002 | (JP) | ............................ P2002-050800 |
| Mar. 11, 2002 | (JP) | ............................ P2002-065380 |
| Jun. 24, 2002 | (JP) | ............................ P2002-182948 |
| Jun. 27, 2002 | (JP) | ............................ P2002-187277 |
| Jun. 27, 2002 | (JP) | ............................ P2002/187798 |

(51) Int. Cl.
    G01C 5/00    (2006.01)
(52) U.S. Cl. .................. 356/3.01; 356/3.02; 356/3.03; 356/3.1; 356/3.15
(58) Field of Classification Search ............... 356/3.01
    See application file for complete search history.

(56) References Cited

U.S. PATENT DOCUMENTS 6,144,761 A    11/2000  Kaneko et al.
6,304,669 B1   10/2001  Kaneko et al.
6,487,517 B2 * 11/2002  Sakai et al. ................. 702/158

FOREIGN PATENT DOCUMENTS

| JP | 11325883 | | 11/1999 |
| JP | 11337336 | | 12/1999 |
| JP | 2000180169 | * | 6/2000 |
| JP | 2001133263 A | * | 5/2001 |
| JP | 3261359 | | 12/2001 |

OTHER PUBLICATIONS

English Language Translation of JP Appln. No. 11-337336.
English Language Translation of JP Appln. No. 11-325883.
English Language Translation of JP Appln. No. 3261359.
Sokkia, "Sokkia Update", Jul. 2002, along with an English Language Translation.

* cited by examiner

*Primary Examiner*—Thomas H. Tarcza
*Assistant Examiner*—Luke D. Ratcliffe
(74) *Attorney, Agent, or Firm*—Greenblum & Bernstein, P.L.C.

(57) ABSTRACT

A surveying system is provided that comprises a position relation calculating processor and a correspondence obtaining processor. The position relation calculating processor calculates a position relation between a coordinate system to which three-dimensional coordinates of a measurement point refer and a schematic image of a surveying field. Here, the schematic image includes the measurement point. The correspondence obtaining processor obtains a correspondence between the three-dimensional coordinates of the measurement point and the two-dimensional coordinates on the schematic image, corresponding to the measurement point.

34 Claims, 16 Drawing Sheets

SURVEYING SYSTEM

BACKGROUND OF THE INVENTION

1. Field of the Invention

The present invention relates to a surveying system. In particular, it relates to a surveying instrument or system, including a theodolite, total station, and the like, that is able to measure an angle between measurement points (or surveying points).

2. Description of the Related Art

In usual surveying or measurement practice, a picture or image of a surveying area including stations (points which are to be measured) may be taken and recorded with the measurement data. An image of a surveying area may be photographed with a normal separate camera not associated with the surveying instruments or with an imaging device integrally installed inside a surveying instrument, as described in Japanese unexamined patent publication No. 11-337336. In this publication, images are captured for each of the measurement points.

SUMMARY OF THE INVENTION

However, when an image is taken with a normal separate camera, measurement points are not indicated on the image, so that it is impossible for a user to identify the points on the image that correspond to each of the measurement points. On the other hand, when utilizing a surveying instrument disclosed in the above unexamined patent publication '336, a large-capacity memory is required, since images are captured and stored for each of the measurement points, which in turn causes cumbersome operations for a user.

Therefore, an object of the present invention is to provide a device, a system, or a program product that enables cooperation between measurement information obtained by a surveying instrument and image information of a surveying area which is obtained by an imaging device.

According to the present invention, a surveying system is provided. The system comprises a position relation calculating processor and a correspondence obtaining processor.

The position relation calculating processor calculates a position relation between a coordinate system to which measurement information of a measurement point refers and a schematic image of a surveying field, where the schematic image includes the measurement point. The correspondence obtaining processor obtains a correspondence between the measurement information of the measurement point and position information, on the schematic image, of a point corresponding to the measurement point.

Further according to the present invention, a digital camera is provided that comprises an imaging device and a position relation calculating processor.

The position relation calculating processor calculates a positional relation between a schematic image and a surveying instrument in accordance with two-dimensional position information of control points on the schematic image and three-dimensional measurement information of the control points measured by the surveying instrument. The correspondence obtaining processor obtains the correspondence between the measurement information of a measurement point, measured by the surveying instrument, and the position information relating to the position of a point corresponds to the measurement point on the schematic image. Further, the number of control points is at least three and the control points are within the schematic image of a surveying field.

Further, according to the present invention, a surveying supporting device is provided that comprises a position relation calculating processor and a correspondence obtaining processor.

Further, according to the present invention, a surveying supporting program product is provided. The program product comprises positional relation calculation process and correspondence calculation process.

The positional relation calculation process calculates positional relation between a schematic image of a surveying field including a measurement point and a surveying instrument. The correspondence calculation calculates the correspondence between measurement information of the measurement point and position information of the point corresponding to the measurement point on the schematic image. The measurement information is obtained by the surveying instrument.

Furthermore, according to the present invention, a surveying system is provided that comprises a surveying instrument, an imaging device, and a correspondence obtaining processor.

The imaging device is arranged at a predetermined position with respect to the surveying instrument, and used for capturing a schematic image of a surveying field, which includes a measurement point. The correspondence obtaining processor obtains correspondence between measurement information of the measurement point, which is measured by the surveying instrument, and position information of the point corresponding to the measurement point on the schematic image.

Furthermore, according to the present invention, a digital camera is provided. The camera is arranged at a predetermined position with respect to a surveying instrument, and the digital camera comprises the imaging device and the correspondence obtaining processor.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
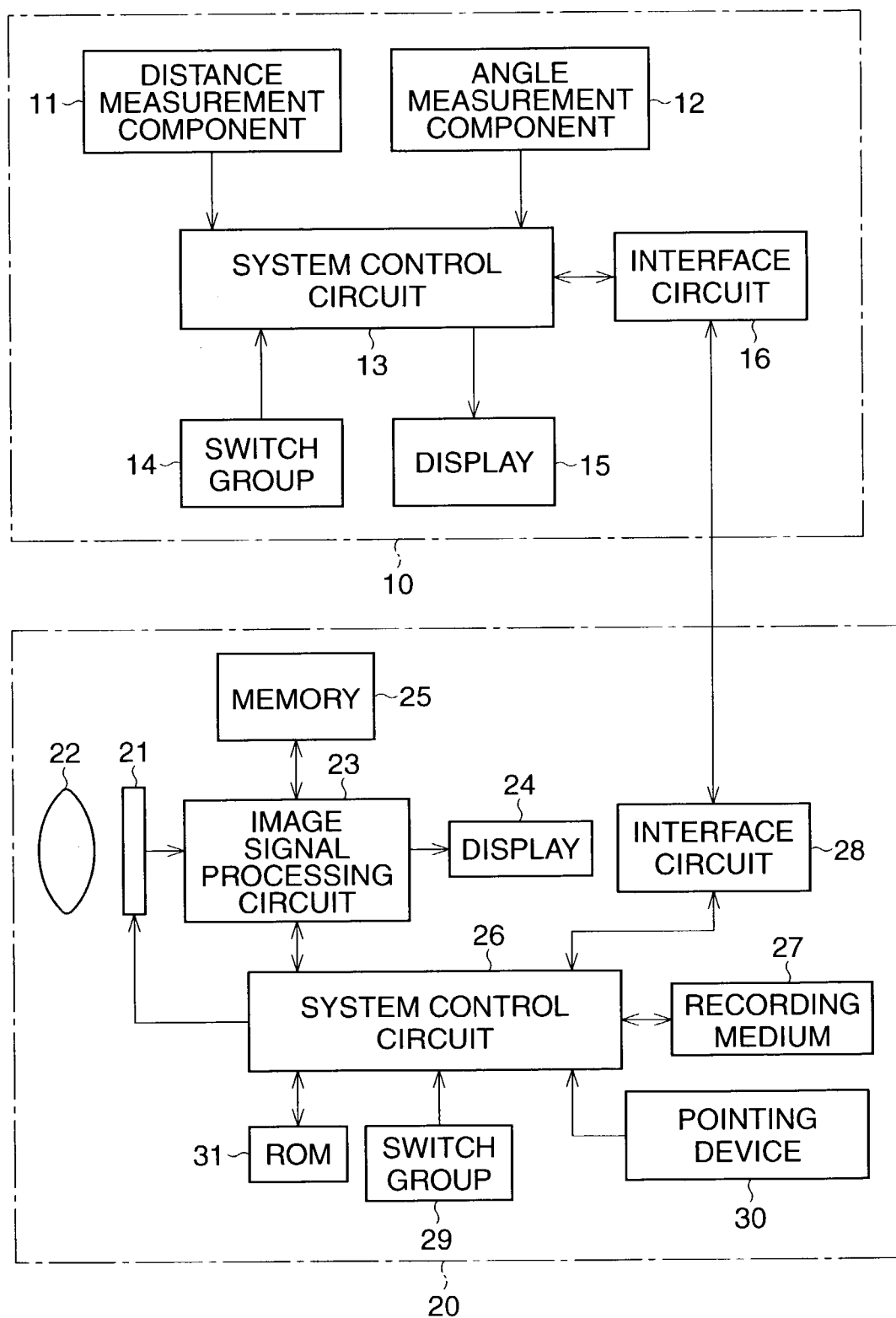
FIG. 1 is a block diagram showing a general electrical construction of a first embodiment of the present invention, which includes a surveying instrument and a camera.

The present invention is described below with reference to the embodiments shown in the drawings.

FIG. 1 is a block diagram showing a general electrical construction of a first embodiment of the present invention, which includes a surveying instrument and a camera.

A surveying instrument for the first embodiment may be a total station or an electronic tacheometer that comprises a distance measurement component 11 and an angle measurement component 12. The distance measurement component 11 is for measuring the oblique distance from the instrument to a measurement point. For example, the distance measurement is carried out by a phase modulation measurement method, a pulse radar method, and the like. At the same time, the angle measurement component 12 continuously detects angles, such as a horizontal angle and an altitude, for example. The distance measurement component 11 and the angle measurement component 12 are connected to a system control circuit 13, whereby they are controlled by signals from the system control circuit 13. For example, the distance measurement component 11 detects a distance in accordance with signals from the system control circuit 13, and outputs the detected data or measurement data to the system control circuit 13. On the other hand, the angle measurement component 12 continuously detects angles at a regular timing and outputs the detected data or measurement data to the system control circuit 13 when it is required. The detected data, such as an oblique distance, horizontal angle, and altitude, are processed in the system control circuit 13. The system control circuit 13 is also connected to a switch group 14, a display 15 (ex. LCD), an interface circuit 16, and so on. A digital still camera (DSC) 20, for example, may be connected to the interface circuit 16 through an interface cable. Note that, the interface circuit 16 is also available for other peripheral devices, such as a data collector, computer, and the like, which are not shown.

An imaging device 21, such as a CCD, is installed inside the digital still camera 20, so that a subject image can be captured through a photographing lens 22. Namely, a subject image is detected as image signals by the imaging device 21 and the signals are fed to the image signal processing circuit 23. The image signals input to the image signal processing circuit 23 may be subjected to predetermined image processing, such as a RGB gain compensation process, white balance compensation process, gamma correction process, super imposing process, and the like. The signals, which were subjected to these processes, may be fed to the display 24 (e.g. LCD) and displayed as a live view. Further, when a release button (not shown), which is included in the switch group 29 connected to the system control circuit 26, is depressed, a subject image is then temporally stored in the memory 25 as a digital image.

The digital image stored in the memory 25 can be indicated on the display 24 via the image signal processing circuit 23. Further, it can be stored in a recording medium 27, such as an IC card, or an optical or magnetic recording medium, through the system control circuit 26. The digital image stored in the recording medium 27 can also be indicated on the display 24 under the control of the system control circuit 26. Further, the image captured by the digital still camera 20 can be transmitted to a computer (a peripheral device) as image data by connecting the digital still camera 20 to the computer through an interface circuit 28 in order to indicate the image.

A pointing device 30 is connected to the system control circuit 26, whereby an arbitrary point on the screen of the display 24 can be appointed. As the pointing device, cursor keys, a track ball, a joystick, touch screen, and so on, may be used. Further, the system control circuit 26 is connected to ROM 31 where the inner orientation parameters for the camera, such as the focal length (or principal distance), difference between the principal point and the center of the image, and parameters of distortion correction, and so on, are stored.

Figure 2:
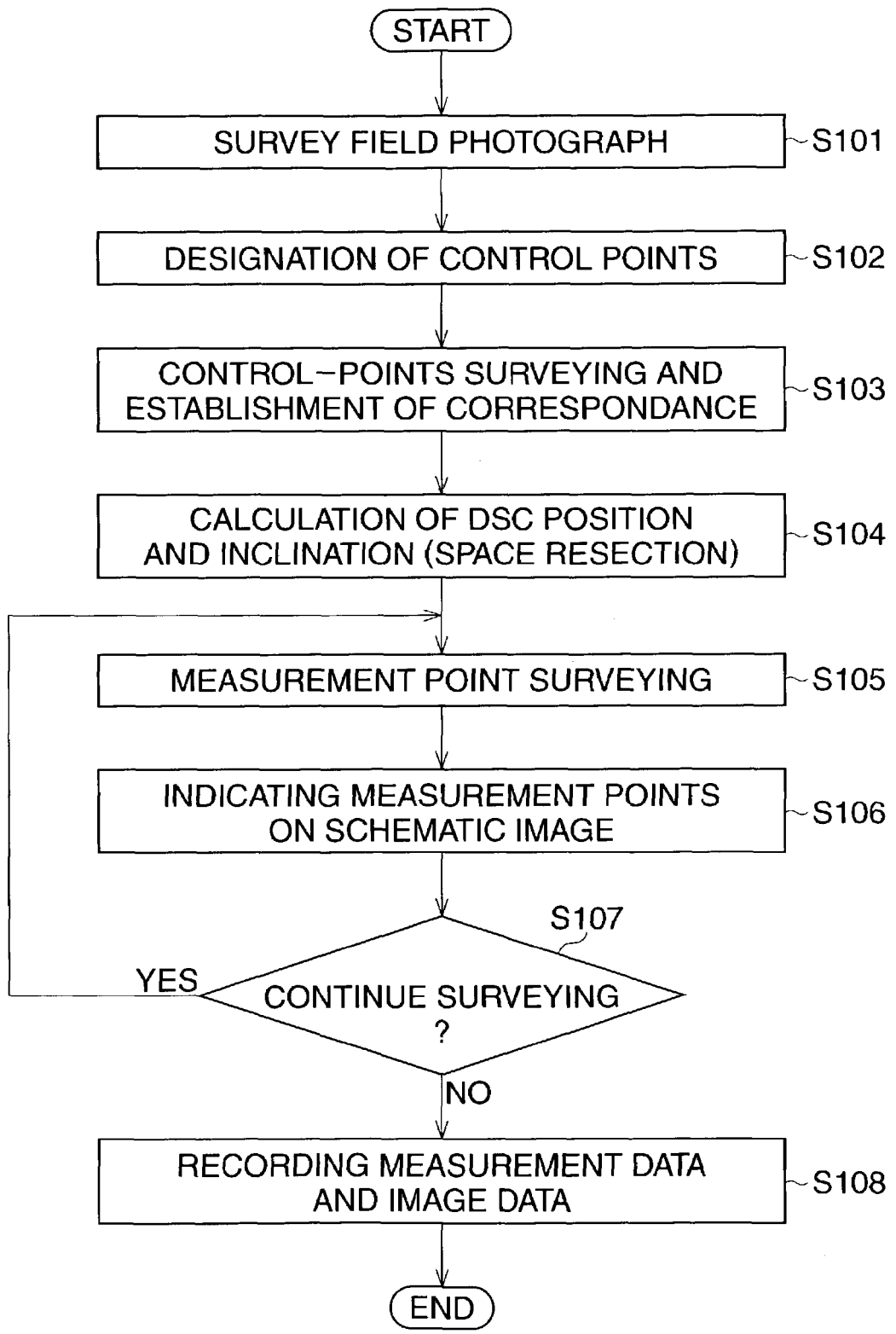
FIG. 2 is a flowchart of survey operation processes in the surveying system.
Figure 3:
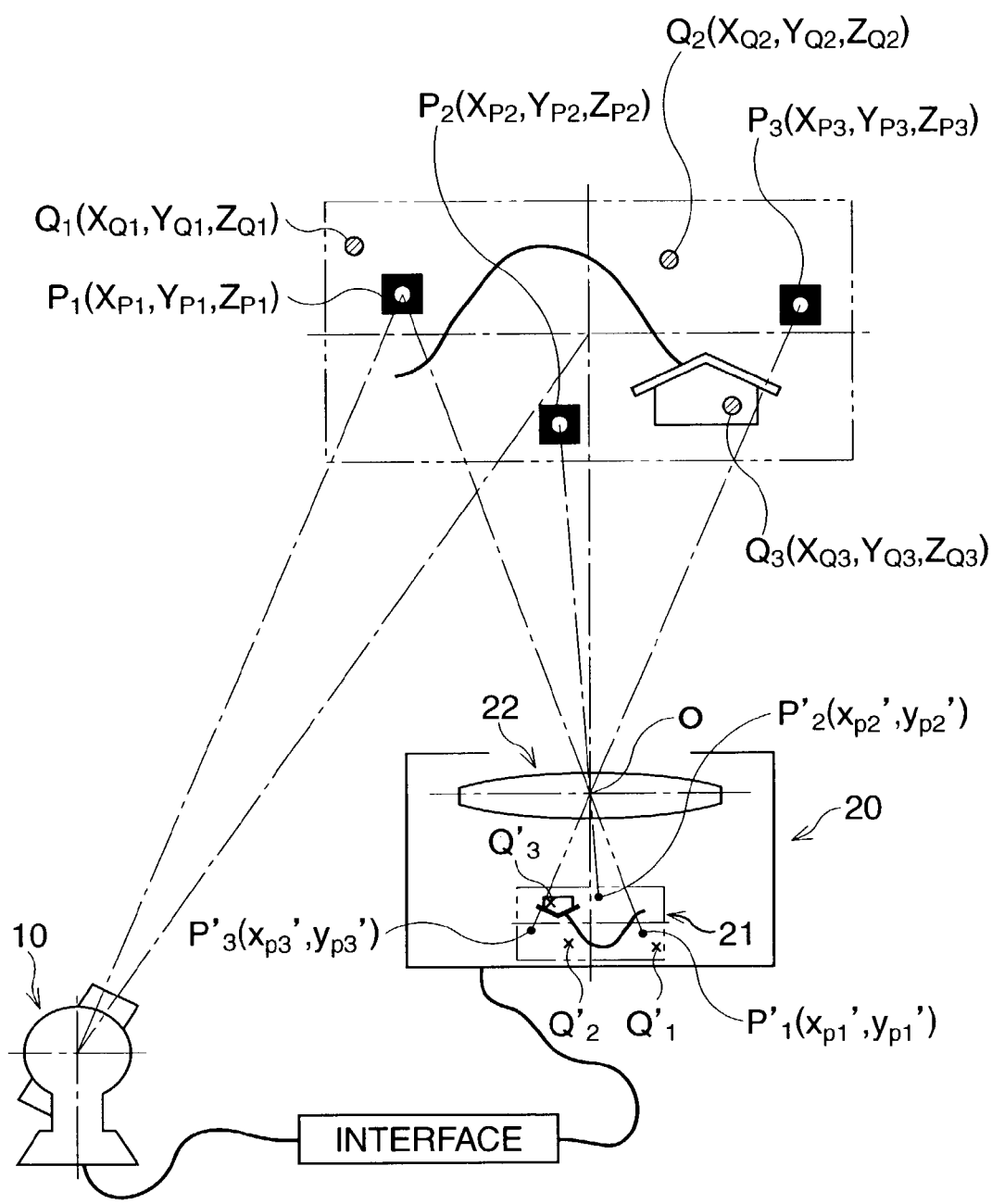
FIG. 3 schematically illustrates an arrangement of the surveying instrument and the camera.

With reference to FIG. 1, FIG. 2, and FIG. 3, a measurement point indicating process in the surveying system of the present embodiment will be described. FIG. 2 is a flowchart of the survey operation processes in the surveying system. FIG. 3 schematically illustrates an arrangement of the surveying instrument and the camera.

At Step 101, an operator takes a picture or image around the surveying area with the digital still camera (DSC) 20. A plurality of measurement points is included within the above single digital image (referred to as a schematic image) taken by the digital still camera 20. In Step 102, the schematic image is indicated on the display 24 of the digital still camera 20, for example, and any of the three points (or pixel) on the schematic image, points which are not aligned on the same line, are selected by the operator by using the pointing device 30. Namely, substantial points in the object space, which correspond to the selected pixels, are designated as control points $P_i$ (i=1, 2, 3). At this time, the positions of image points $P_i'$ that correspond to each of the control points $P_i$ are derived as two-dimensional image coordinates $(xp_i', yp_i')$ in accordance with the inner orientation parameters stored in the ROM 31. Note that, the image coordinate system is a two-dimensional coordinate system of which the origin is at the upper left corner of the image with the y'-axis being positive in the downward direction. Note that, the number of control points can be more than three and the only requirements are that there are at least three of them and that they are not aligned in a single line.

In Step S103, an oblique distance and the angles (such as an altitude and horizontal angle) of each control point $P_i$, which are appointed in Step S102, are measured by an operator by using the survey instrument 10. Measured values are then fed to the system control circuit 26 of the digital still camera 20 via the interface. At the system control circuit 26, three-dimensional coordinates $(Xp_i, Yp_i, Zp_i)$ for each of the control points $P_i$ are calculated in a predetermined surveying coordinate system (for example, a left-handed coordinate system with its origin at the instrument point). Further, at this time, the correspondence between the surveying coordinates $(Xp_i, Yp_i, Zp_i)$ for each of the control points $P_i$ and the image coordinates $(xp_i', yp_i')$ for image points $P_i'$ are settled. Note that, the surveying coordinates calculation may be carried out in the surveying instrument, and then the calculated data is sent to the digital still camera.

As will be detailed later, the position and the inclination of the digital camera 20, at the moment when the schematic image was taken, are calculated in Step S104, in accordance with the correspondence between the surveying coordinates and the image coordinates for each of the control points $P_i$, by means of space resection. Namely, the position or the surveying coordinates $(X_O, Y_O, Z_O)$ of the origin of the three-dimensional camera coordinate system, which is fixed to the digital still camera 20, and the rotational angle $(\omega, \phi, \kappa)$ about the x-axis, y-axis, and z-axis of the camera coordinate system at the time are derived as the exterior orientation parameters. Thereby, the perspective projection relationship between the image coordinates and the surveying coordinates is established. Note that, the camera coordinate system is a left-handed coordinate system of which the origin "O" is identical to the center of lens or the center of the projection, and in which the y-axis and z-axis are parallel to each of the s'-axis and t'-axis of the screen coordinate system. Further, the x-axis of the camera coordinate system is normal to the imaging surface and is oriented to the side opposite to the imaging surface from the center of the projection. Namely, when the principal distance of the photographing lens 22 is "f", any point on the imaging surface is represented by the camera coordinates $(-f, y, z)$. Note that, the screen coordinate system is a two-dimensional coordinate system of which the origin is defined at the principal point with each of the s'-axis and t'-axis arranged in parallel with each of the x'-axis and y'-axis, that is, in parallel with each of the horizontal and vertical lines of the imaging device 21 (see FIG. 5).

In Step S105, an operator surveys a measurement point $Q_i$ (i=1,2,3 . . . ) with the surveying instrument 10. The measured values or data are transferred to the digital still camera 20 through the interface. The surveying coordinates of the measurement point $Q_i$ are then calculated in the system control circuit 26 of the digital still camera 20. In Step S106, the image coordinates $(xq_i', yq_i')$ of the image point $Q_i'$ on the schematic image, the image point that corresponds to the measurement point $Q_i$, are derived from the surveying coordinates of the measurement point $Q_i$ obtained in Step S105 and the exterior orientation parameters $(X_O, Y_O, Z_O)$ and $(\omega, \phi, \kappa)$ calculated in Step S104. A mark that indicates the measurement point $Q_i$ or the measurement values is then superimposed at the position which corresponds to the image coordinates $(xq_i, yq_i)$, and is displayed on the display 24 of the digital still camera 20. Note that, the position (image coordinates) of a pixel that corresponds to the image point $Q_i'$ is obtained from the screen coordinates $(sq_i', tq_i')$ of the image point $Q_i'$ and the pitches between the pixels.

When it is determined that the surveying operations will be continued, in Step S107, the operations from Step S105 to Step S106 are repeated. For example, when the measurement points $Q_2$, $Q_3$ are measured by the surveying instrument 10, marks or numerals that indicate each of the measurement points $Q_2$, $Q_3$ or their measured values are displayed at the points corresponding to the image points $Q_2'$, $Q_3'$ of the measurement points $Q_2$, $Q_3$. On the other hand, when the surveying operation is complete, image data of the schematic image, inner orientation parameters of the camera, image coordinates (or position information that indicates a point on a schematic image; e.g. data that represents pixel position) of the image points $Q_1'$, $Q_2'$, and $Q_3'$, and oblique distances, altitudes, and horizontal angles of the measurement points $Q_1$, $Q_2$, and $Q_3$, or measurement data (or measurement information), such as surveying coordinates, are associated and recorded in the recording medium 27 in Step S108. Then the measurement point indicating process using the surveying system of the present embodiment ends. Note that, the image data of the schematic image, image coordinate data of the measurement points, measurement data, and so on, may be stored in separate files or a single file.

Figure 4:
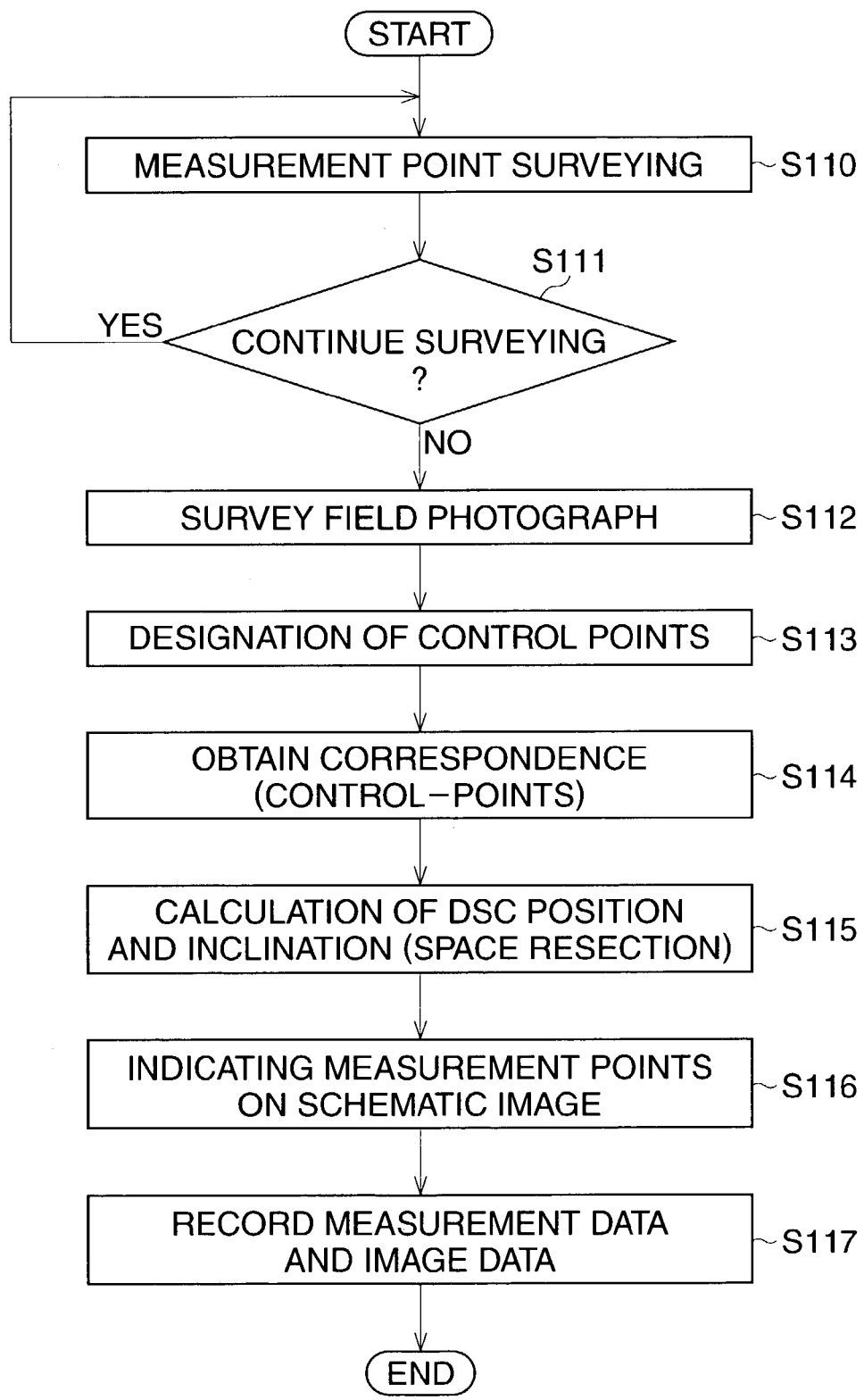
FIG. 4 is a flowchart of the surveying operation in the alternate embodiment.

Further, an alternate embodiment for the surveying system of the first embodiment will be described with reference to FIG. 4. FIG. 4 is a flowchart of the surveying operation in the alternate embodiment.

In the surveying operation described in FIG. 2, the position and the inclination of the digital still camera 20 in the surveying coordinate system are at first derived by means of space resection (S104), and then the measurement points are indicated on the schematic image individually each time the measurement point is measured. However, in this alternate embodiment, which is indicated by the flowchart of FIG. 4, the position and the inclination of the digital still camera 20 in the surveying coordinate system are derived after the completion of the measurement by the surveying instrument 10 for all measurement points, and then points corresponding to each of the measurement points are indicated on the schematic image simultaneously.

Namely, in Step S110 and S111, measurement for a plurality of measurement points is continuously carried out by using the surveying instrument. When the measurement or surveying is complete, the digital still camera 20 captures a schematic image in Step 112, which includes the measurement points measured in Step S110. In Step S113, three arbitrary measurement points or pixels, which are not included in the same line, are selected from the measurement points indicated on the schematic image by an operator as control points by using the pointing device 30. The correspondence between the three-dimensional coordinates $(Xp_i, Yp_i, Zp_i)$ of the measurement points and the control points $P_i$ selected in Step S113 is made in Step S114 by the operator.

In Step S115, the position and the inclination of the digital still camera 20 are calculated in accordance with the correspondence between the control points $P_i$ and the surveying coordinates obtained in Step S114 by means of the space resection, as well as Step S104 of FIG. 4. Image coordinates of the schematic image corresponding to every measurement point measured in Step S110 are then calculated, in Step S116, in accordance with the exterior orientation parameters derived in Step S115. Further, marks that indicate the positions or measured values of the measurement points are superimposed on the schematic image and displayed on the display 24. In Step S117, each set of data is recorded in the recording medium 27, the same as in Step S108, and this is the end of the surveying operation of the present alternative embodiment.

Note that, in FIGS. 2 and 4, an image surrounding the surveying area or a schematic image is taken at Steps S101 and S112, however, an image taken previously may be used as a schematic image. Further, the surveying system may be developed to carry out image-capturing and surveying simultaneously. This is achieved by adapting a system to link a switch in the switch group 14, which is for starting the surveying, and a DSC release switch in the switch group 29. Further, Steps S101–S104 may be carried out a day or more prior to Steps S105–S108. In this case, the surveying instrument must be positioned in the same place. Further, as described in the flowchart of FIG. 4, the surveying in Step S110 may have been carried out prior to carrying out the composition with a schematic image. Furthermore, previously measured or given measurement data, including the data for the triangular marks, any type of map data, or geographical data, may be used, instead of carrying out the surveying operation of Step S110.

Next, with reference to FIG. 5 and FIG. 6, a principle for obtaining the position and the inclination of the digital still camera 20 by space resection (Step S103), and a principle for indicating measurement points on a schematic image (Step S106) will be explained.

Figure 5:
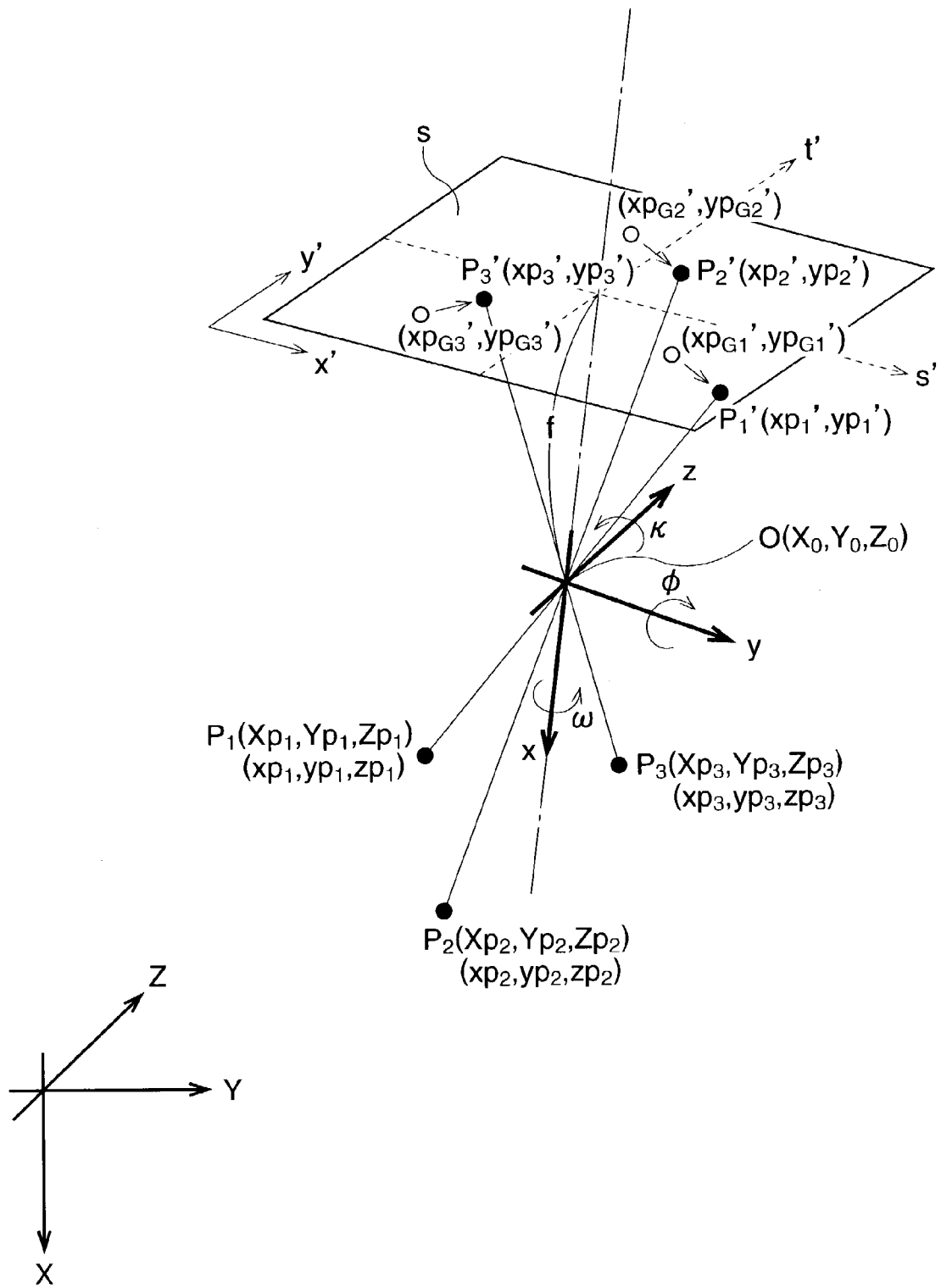
FIG. 5 schematically illustrates the relations between the control points and the corresponding image points on the imaging surface S.
Figure 6:
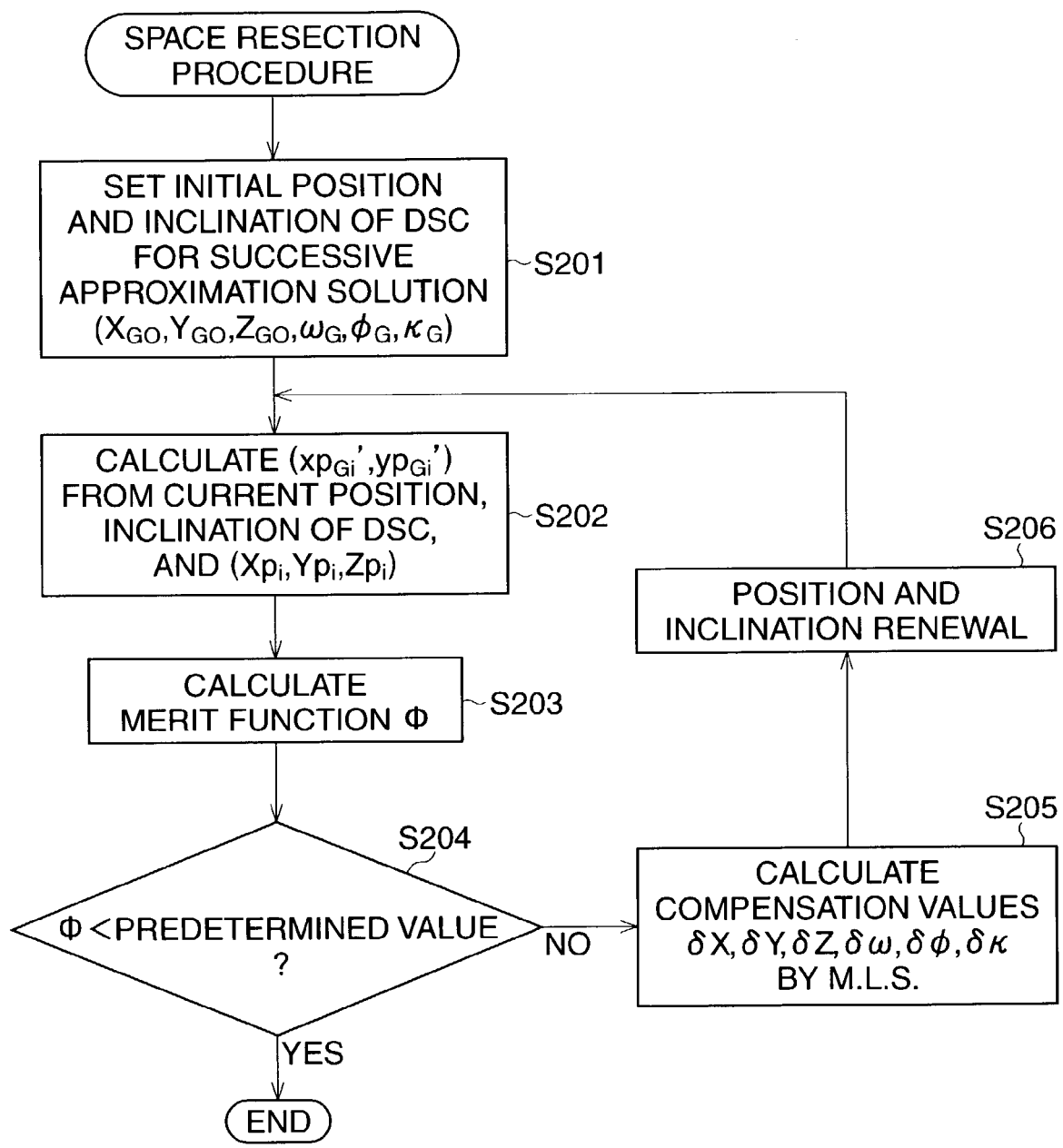
FIG. 6 is a flowchart of the space resection program that calculates exterior orientation parameters which represent the position and the inclination of the digital still camera.

FIG. 5 schematically illustrates the relations between the three control points $P_1$, $P_2$, and $P_3$, and the corresponding image points $P_1'$, $P_2'$, and $P_3'$ on the imaging surface S. FIG. 6 is a flowchart of the space resection program that calculates exterior orientation parameters $(X_O, Y_O, Z_O, \omega, \phi, \kappa)$ which represent the position and the inclination of the digital still camera 20 at the time when Step S104 of FIG. 2 is executed. For the space resection calculation, a least square method including a successive approximation solution is applied. Note that, although it is acceptable if the number of control points is three or more than three, here, a case when only three points are designated for the control points is explained, as an example.

In Step 201, initial values $(X_{GO}, Y_{GO}, Z_{GO}, \omega_G, \phi_G, \kappa_G)$ for the exterior orientation parameters $(X_O, Y_O, Z_O, \omega, \phi, \kappa)$ which represent the position and the inclination of the camera, are appropriately given as approximate values. Then in Step S202, approximate image coordinates $(Xp_{Gi}', Yp_{Gi}')$ of the image point $P_i'$ (i=1,2,3), which correspond to each of the three control points $P_i$, are calculated from the surveying coordinates $(Xp_i, Yp_i, Zp_i)$ of the respective control points $P_i$, by using the given exterior orientation parameters $(X_{GO}, Y_{GO}, Z_{GO}, \omega_G, \phi_G, \kappa_G)$.

The coordinates $(xp_i, yp_i, zp_i)$ of the control points $P_i$ (i=1,2,3) in the camera coordinate system are derived from coordinates $(Xp_i, Yp_i, Zp_i)$ of the surveying coordinate system by Eq. (1), thereby, approximate camera coordinates $(xp_{Gi}, yp_{Gi}, zp_{Gi})$ of the control points $P_i$ are obtained by substituting the approximate exterior orientation parameters $(X_{GO}, Y_{GO}, Z_{GO}, \omega_G, \phi_G, \kappa_G)$ and the surveying coordinates $(xp_i, yp_i, zp_i)$ of the control points $P_i$ into Eq. (1).

$$\begin{pmatrix} xp_i \\ yp_i \\ zp_i \end{pmatrix} = \begin{pmatrix} T_{11} & T_{12} & T_{13} \\ T_{21} & T_{22} & T_{23} \\ T_{31} & T_{32} & T_{33} \end{pmatrix} \begin{pmatrix} Xp_i - X_0 \\ Yp_i - Y_0 \\ Zp_i - Z_0 \end{pmatrix} \quad (1)$$

where $\{T_{jk}\}$ represents a rotational matrix, and each of the elements $T_{jk}$ are described in the following forms.

$T_{11} = \cos\phi \cdot \cos\kappa$ $T_{12} = \cos\omega \cdot \sin\kappa + \sin\omega \cdot \sin\phi \cdot \cos\kappa$ $T_{13} = \sin\omega \cdot \sin\kappa - \cos\omega \cdot \sin\phi \cdot \cos\kappa$ $T_{21} = -\cos\phi \cdot \sin\kappa$ $T_{22} = \cos\omega \cdot \cos\kappa - \sin\omega \cdot \sin\phi \cdot \sin\kappa$ $T_{23} = \sin\omega \cdot \cos\kappa + \cos\omega \cdot \sin\phi \cdot \sin\kappa$ $T_{31} = \sin\phi$ $T_{32} = -\sin\omega \cdot \cos\phi$ $T_{33} = \cos\omega \cdot \cos\phi$ The screen coordinates $(sp_i', tp_i')$ of the image point $P_i'$ for the control points $P_i$ are derived from the collinear condition, wherein a control point, the center of projection, and the corresponding image point are aligned on the same line. Therefore, the screen coordinates $(sp_i', tp_i')$ are calculated by introducing the exterior orientation parameters $(X_O, Y_O, Z_O, \omega, \phi, \kappa)$ and the camera coordinates $(xp_i, yp_i, zp_i)$ of control points $P_i$ into the following Eq. (2).

$$sp_i' = f\frac{yp_i}{xp_i} = f\frac{T_{21}(Xp_i - X_0) + T_{22}(Yp_i - Y_0) + T_{23}(Zp_i - Z_0)}{T_{11}(Xp_i - X_0) + T_{12}(Yp_i - Y_0) + T_{13}(Zp_i - Z_0)} \quad (2)$$

$$tp_i' = f\frac{zp_i}{xp_i} = f\frac{T_{31}(Xp_i - X_0) + T_{32}(Yp_i - Y_0) + T_{33}(Zp_i - Z_0)}{T_{11}(Xp_i - X_0) + T_{12}(Yp_i - Y_0) + T_{13}(Zp_i - Z_0)}$$

Consequently, by substituting approximate exterior orientation parameters $(X_{GO}, Y_{GO}, Z_{GO}, \omega_G, \phi_G, \kappa_G)$ and approximate camera coordinates $(xp_{Gi}, yp_{Gi}, zp_{Gi})$ of the control points $P_i$, which are obtained by Eq. (1), into Eq. (2), approximate screen coordinates $(SP_{Gi}', tp_{Gi}')$ of the image points $P_i'$ that correspond to each of the control points $P_i$ are calculated.

Further, approximate image coordinates $(xp_{Gi}', yp_{Gi}')$ of the image points $P_i'$ can be derived by substituting the approximate screen coordinates $(sp_{Gi}', tp_{Gi}')$ into the following Eq. (3).

$xp_i' = sp_i'/Px + W/2$ $yp_i' = tp_i'/Py + H/2 \quad (3)$ where Px and Py are the pixel pitches of the CCD or the image in the horizontal and vertical directions respectively, and W and H are the numbers of pixels in the CCD or the image, which are aligned in the horizontal and vertical directions respectively.

In Step S203, a merit function $\Phi$ is calculated in order to determine whether the approximately given exterior orientation parameters $(X_{GO}, Y_{GO}, Z_{GO}, \omega_G, \phi_G, \kappa_G)$ are appropriate. For example, the merit function $\Phi$ is determined by the following Eq. (4).

$$\Phi = \sum_{i=1}^{3}\{(xp_i' - xp_{Gi}')^2 + (yp_i' - yp_{Gi}')^2\} \quad (4)$$

Namely, in the present embodiment, the merit function $\Phi$ corresponds to the total amount of squared distances between the image coordinates $(xp_i', yp_i')$ of image points $P_i'$ corresponding to the control points $P_i$ (which are selected in the schematic image), and the approximate image coordinates $(xp_{Gi}', yp_{Gi}')$ of the image points $P_i'$ calculated from the surveying coordinates $(Xp_i, Yp_i, Zp_i)$ of the control points $P_i$ and the approximately given exterior orientation parameters $(X_{GO}, Y_{GO}, Z_{GO}, \omega_G, \phi_G, \kappa_G)$.

Then, whether the merit function is smaller than a predetermined value is determined, in Step S204. That is, whether the approximate image coordinates $(xp_{Gi}', yp_{Gi}')$ of the image points $P_i'$, which are obtained from the approximately given exterior orientation parameters $(X_{GO}, Y_{GO}, Z_{GO}, \omega_G, \phi_G, \kappa_G)$, are sufficiently close to the image coordinates $(xp_i', yp_i')$ of the image points $P_i'$ corresponding to the control points $P_i$, which are designated on the schematic image, is determined. When the value $\Phi$ is smaller than the predetermined value, this process is terminated and the values of the presently given exterior orientation parameters $(X_{GO}, Y_{GO}, Z_{GO}, \omega_G, \phi_G, \kappa_G)$ are determined as the exterior orientation parameters that represent the position and the inclination of the camera when the schematic image was captured.

On the other hand, when the value of $\Phi$ is determined to be larger or equal to the predetermined value, in Step S204, then in step S205, compensation values $(\delta X, \delta Y, \delta Z, \delta\omega, \delta\phi, \delta\kappa)$ for the approximately given exterior orientation parameters $(X_{GO}, Y_{GO}, Z_{GO}, \omega_G, \phi_G, \kappa_G)$ are calculated by using the least squares method, for example. Namely, Eq. (2) having the collinearity condition is subjected to Taylor's expansion at the approximate exterior orientation parameters $(X_{GO}, Y_{GO}, Z_{GO}, \omega_G, \phi_G, \kappa_G)$ and the higher order terms are neglected so as to linearize the formula, then normal equations regarding the compensation values $(\delta X, \delta Y, \delta Z, \delta\omega, \delta\phi, \delta\kappa)$ as unknown values are derived in order to obtain the appropriate compensation values $(\delta X, \delta Y, \delta Z, \delta\omega, \delta\phi, \delta\kappa)$.

In Step S206, the approximate exterior orientation parameters $(X_{GO}, Y_{GO}, Z_{GO}, \omega_G, \phi_G, \kappa_G)$ are altered by the compensation values $(\delta X, \delta Y, \delta Z, \delta\omega, \delta\phi, \delta\kappa)$ which are obtained in Step S205. That is, each of the values $(X_{GO}, Y_{GO}, Z_{GO}, \omega_G, \phi_G, \kappa_G)$ is replaced by the values $(X_{GO}+\delta X, Y_{GO}+\delta Y, Z_{GO}+\delta Z, \omega_G+\delta\omega, \phi_G+\delta\phi, \kappa_G+\delta\kappa)$ to thereby renew or compensate the position and the inclination of the camera. Then the process returns to Step S202, so that Steps S202 through S206 are repeated until the value $\Phi$ is determined to be smaller than the predetermined value in Step S204.

Note that, the above explained procedure is for cases when the inner orientation parameters, such as those relating to distortion, are void or negligible, or when a schematic image has already been compensated. In order to compensate an uncompensated schematic image with, for example, distortion inner orientation parameters, the screen coordinates $(sp_{Gi}', tp_{Gi}')$ obtained by Eq. (2) are subjected to distortion correction by using the following Eq. (5) to thereby transform the screen coordinates $(sp_{Gi}', tp_{Gi}')$ to distortion corrected screen coordinates $(scp_{Gi}', tcp_{Gi}')$.

$$R^2 = sp_i'^2 + tp_i'^2$$

$$scp_i' = sp_i'(1 + D_2 R^2 + D_4 R^4 + D_6 R^6) + (R^2 + 2 sp_i'^2) N_1 + 2 sp_i' tp_i' N_2 + X_C$$

$$tcp_i' = tp_i'(1 + D_2 R^2 + D_4 R^4 + D_6 R^6) + 2 sp_i' tp_i' N_1 + (R^2 + 2 tp_i'^2) N_2 + Y_C \quad (5)$$

Here, the coefficients $D_2$, $D_4$, and $D_6$ are the second, fourth, and sixth order components of the distortion, respectively. Further, the coefficients $N_1$ and $N_2$ are unsymmetrical components of distortion, and $X_C$ and $Y_C$ are dislocations of the principal point in the s'-axis and t'-axis directions, from the center of the image. In turn, the image coordinates $(xp_{Gi}', yp_{Gi}')$ can be derived from the following Eq. (6).

$$xp_i' = scp_i'/Px + W/2$$

$$yp_i' = tcp_i'/Py + H/2 \quad (6)$$

When the exterior orientation parameters $(X_O, Y_O, Z_O, \omega, \phi, \kappa)$ (which represent the position and the inclination of the digital still camera 20 at the time when the schematic image is captured) are calculated by using space resection, the image coordinates of an image point corresponding to a measurement point surveyed in Step S105 of FIG. 2, are obtained from its surveying coordinates (derived from the oblique distance and the altitude measured) and the exterior orientation parameters by substituting these values into Eqs. (1) and (2). In Step S106, a mark or measured values representing a measurement point is/are indicated on the schematic image, at a point (pixel) which corresponds to the measurement point, in accordance with the above obtained image coordinates.

As described above, according to the first embodiment of the present invention, the position of a measurement point can be easily made to correspond to a position or a pixel of the schematic image captured at the surveying field by using measurement data of the measurement point. Therefore, since any of measurement point within the schematic image can be indicated on the schematic image, the positions or disposition of the measurement points can be easily verified on the schematic image. Further, a plurality of measurement points can be mapped on a single schematic image, so that memory for storing images is reduced and measurement data can be efficiently associated with image information of the surveying area or field. Note that, absolute coordinates for a control point, including latitude and longitude or any type of positioning format defined by the relevant surveying authority, may be adapted to the survey coordinates. Further, the selection of surveying coordinates is up to a user's requirement.

When measurement information comprises a plurality of different coordinate systems, the measurement information may be transformed to a certain uniform coordinate system prior to beginning the surveying operation in order to facilitate the calculation processes. This process is used when indicating measurement points on the schematic image and when indicating control points on the schematic image with respect to measurement information as well. For example, this happens when measurement points are represented by different coordinate systems. In turn, for example, when previously given or known measurement data are partly used as control points, their coordinate system may be different from those used in the surveying operation. In this occasion, the given measurement data are subjected to a coordinate transformation and transformed to the coordinates adapted to the coordinate system used in the surveying operation. However, the measurement data with respect to the coordinate system of the surveying operation may be transformed and adapted to the previously given data coordinates.

Figure 7:
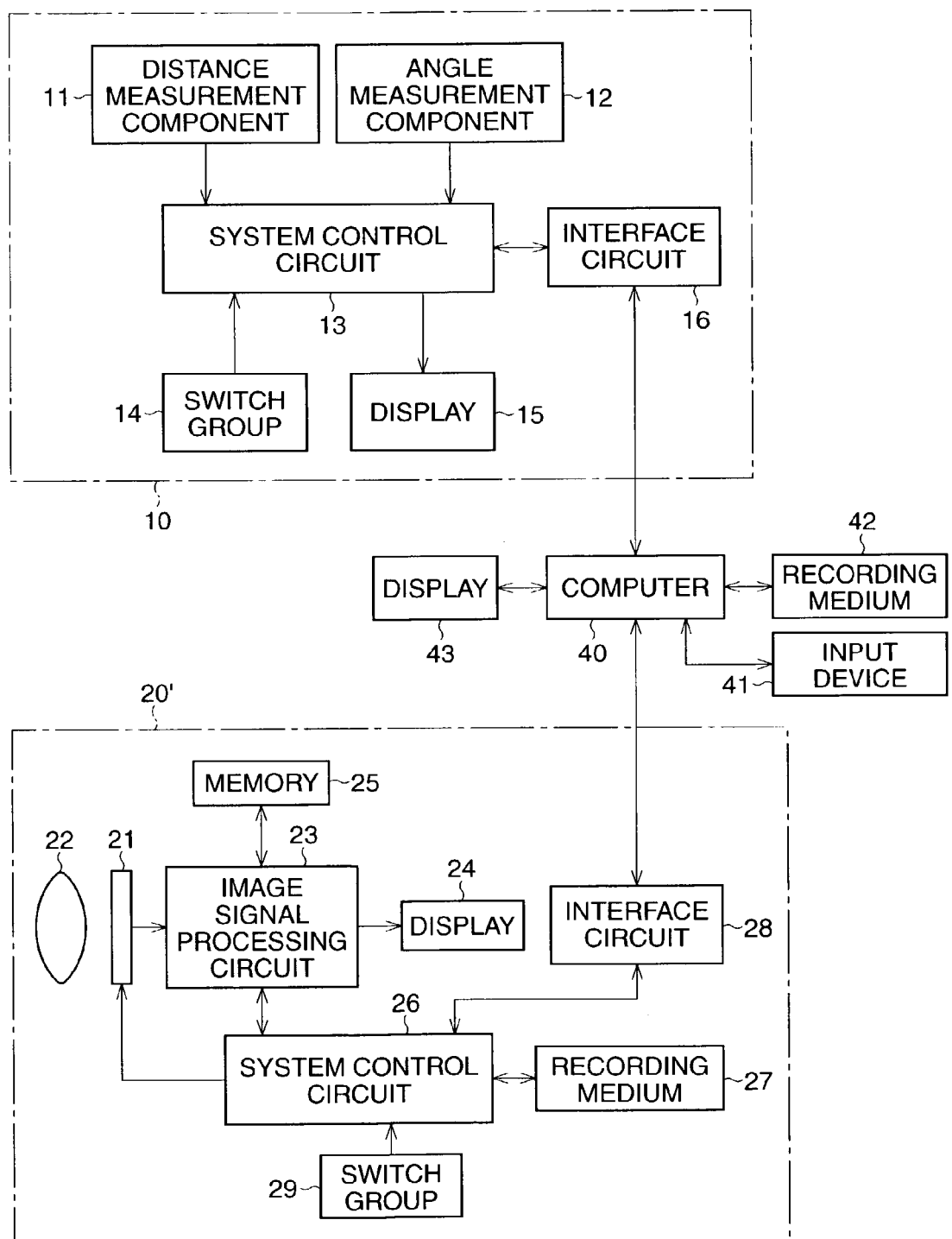
FIG. 7 is a block diagram that schematically shows a construction of the surveying system in the second embodiment.

Next, with reference to FIG. 7, a surveying system of the second embodiment in the present invention is described. Since the second embodiment is similar to the first embodiment, only those things that are dissimilar to the first embodiment will be explained. Note that, the components which are common with the first embodiment will be referred to using the same numerals.

FIG. 7 is a block diagram that schematically shows a construction of the surveying system in the second embodiment. In the second embodiment, a common digital still camera 20' available on the market, for example, is used for capturing a schematic image of a surveying area or surveying field. At first, the digital still camera 20' is connected to a computer 40 via an interface cable. An example of the computer 40 is a notebook sized personal computer (PC). A schematic image of the surveying area, which is taken by the digital still camera 20', is then transmitted to the computer 40. Finally, the computer 40 is connected to the surveying instrument 10 via an interface cable. An input device, such as a mouse, trackball, joystick, and keyboard are connected to the computer 40. Likewise, a recording medium 42, such as a hard disk, DVD, MO, IC card, and the like, are connected to the computer 40. Further, a display 43, such as LCD, CRT, and so on, is also connected the computer 40.

Image data of the schematic image sent to the computer 40 may be recorded in the recording medium 42. The schematic image is displayed on the display 43 by a surveying-support program installed in the computer 40. The processes that are described in the steps up to Step S102 of FIG. 2 are carried out by the surveying-support program between the surveying instrument 10 and the computer 40. Namely, an operator designates three or more points (pixels), not aligned on the same line, as control points $P_i$ on the schematic image displayed on the display 43 by using a pointing device. The position of the designated control points $P_i$ are then measured or surveyed by the surveying instrument 10. The surveying-support program then calculates the exterior orientation parameters $(X_O, Y_O, Z_O, \omega, \phi, \kappa)$ of the digital still camera 20' (the parameters at the time when the schematic image is captured) in accordance with the image coordinates of the image points $P_i'$ of the control points $P_i$, and the surveying coordinates of the control points $P_i$ which are obtained from the measured values. As a result, the projection relations between the image coordinates and the surveying coordinates are established. From the measurement data of the measurement points detected by the surveying instrument, the surveying-support program displays marks or measured values that indicate the position of the measurement points on the schematic image (which is displayed on the display 43) with reference to the established projection relations. Further, the measurement data, captured image data, inner orientation parameters, exterior orientation parameters, and so on, are associated with each other and recorded in the recording medium 42.

Note that, a camera used in the second embodiment is not always exclusive for the surveying, thus inner orientation parameters may be unknown. In this situation, the inner orientation parameters are obtained prior to the surveying operation by means of an inner orientation process and the image coordinates are calculated by using the calculated inner orientation parameters.

As described above, according to the second embodiment, an effect similar to the first embodiment is obtained. Further, in the second embodiment, a common digital still camera available on the market can be used. Although, the system may be structured as an exclusive apparatus for supporting surveying, the surveying-support program of the present embodiment can be installed in an ordinary computer (e.g. a portable personal computer, such as notebook sized personal computer), so that the above described surveying system can be easily provided at low cost.

Next, with reference to FIGS. 8–12, the third embodiment of the present invention will be explained. Since the third embodiment is similar to the first embodiment, only those things that are dissimilar to the first embodiment will be explained. Further, the components which are common with the first embodiment will be referred to as the same numerals.

Figure 8:
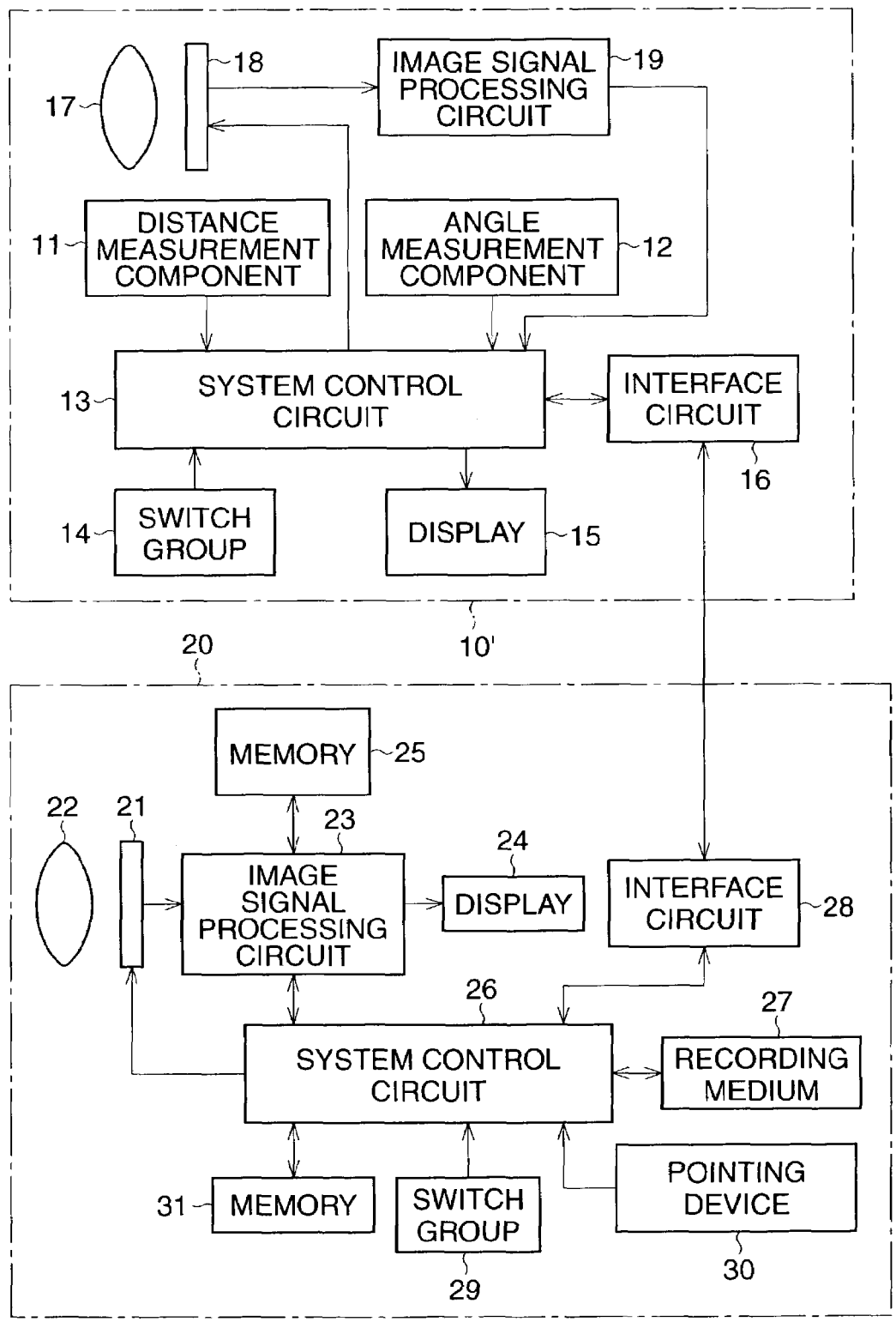
FIG. 8 is a block diagram that schematically shows an electrical construction of the surveying system in the third embodiment.

FIG. 8 is a block diagram that schematically shows an electrical construction of the surveying system in the third embodiment. A surveying instrument 10' of the third embodiment comprises an imaging device 18, such as a CCD and the like, so that an image around a sighted point can be captured through a photographing lens 17. Image signals from the imaging device 18 are subjected to a predetermined image processing, such as a white balance compensation process, gamma correction process, and so on, and are then fed to the display 15 through the system control circuit 13 and may be displayed as a live view. Further, the image captured by the imaging device 18 can be fed to the digital still camera 20 via the interface circuit 16 as digital image data, and so to can the measurement data. Note that, in the present embodiment, the surveying instrument 10' and the digital still camera 20 are connected by the interface cable, however, data communication may be carried out through wireless communication.

Further, the switch group 14 is connected to the system control circuit 13, so that signal processing in the system control circuit 13 is controlled according to switch operations by an operator. Note that, the optical system of the sighting telescope of the surveying instrument 10', which is used for distance and angle measurement, may be used as an optical system of the photographing lens 17. With this construction, the view area of an image captured by the imaging device 18 will substantially coincide with the scope of the sighting telescope.

Figure 9:
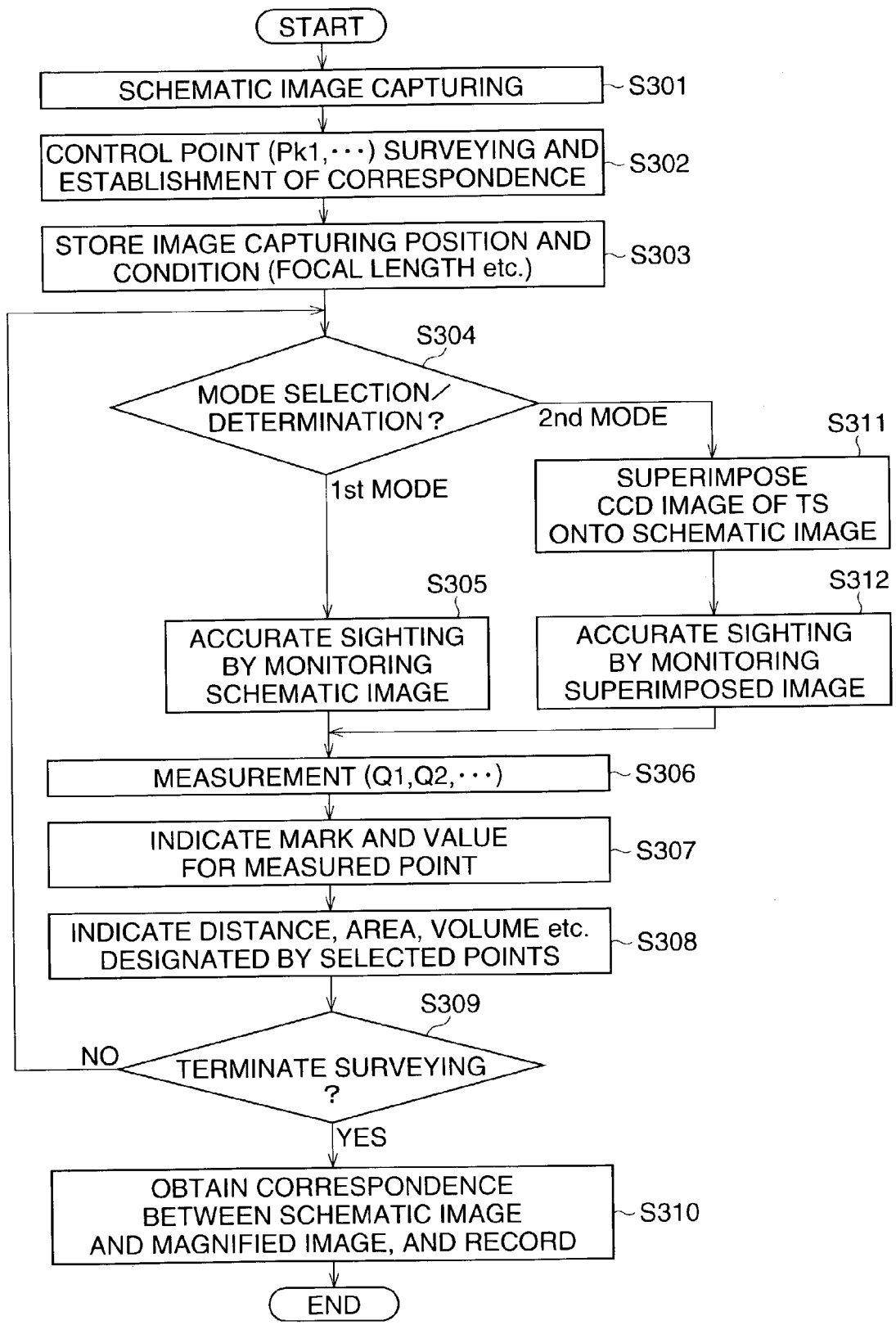
FIG. 9 is a flowchart of the surveying operations carried out in the surveying system of the third embodiment.

FIG. 9 is a flowchart of the surveying operations carried out in the surveying system of the third embodiment. In Step S301 (corresponding to Step S101), a schematic image of the surveying area or field is captured with the digital still camera 20. Three or more than three control points (e.g. $P_1$, $P_2$, and $P_3$) are then designated on the schematic image indicated on the indicating device 24, in Step S302 (corresponding to Steps S102, S103, S104), by using the pointing device 30. Further, in Step S302, the three-dimensional positions of each designated control point are surveyed by the surveying instrument 10', so that correspondence or mapping between image coordinates on the schematic image and the measurement information is provided for each of the control points. Furthermore, in accordance with the above correspondence, the position and the inclination of the digital still camera 20 are obtained as exterior orientation parameters $(X_O, Y_O, Z_O, \omega, \phi, \kappa)$ by means of space resection. In Step S303, the position and inclination of the camera, which are described by the exterior orientation parameters $(X_O, Y_O, Z_O, \omega, \phi, \kappa)$, and data that relates to the inner orientation parameters, such as the focal length and the like, are recorded in the recording medium 27.

In Step S304, a mode for the surveying operation is selected or determined. The system in the present embodiment comprises a first mode and a second mode (which will be detailed later). For example, either one of the first mode or second mode may be selected by a predetermined mode selecting switch (not shown) in the switch group 29 by an operator.

Figure 10:
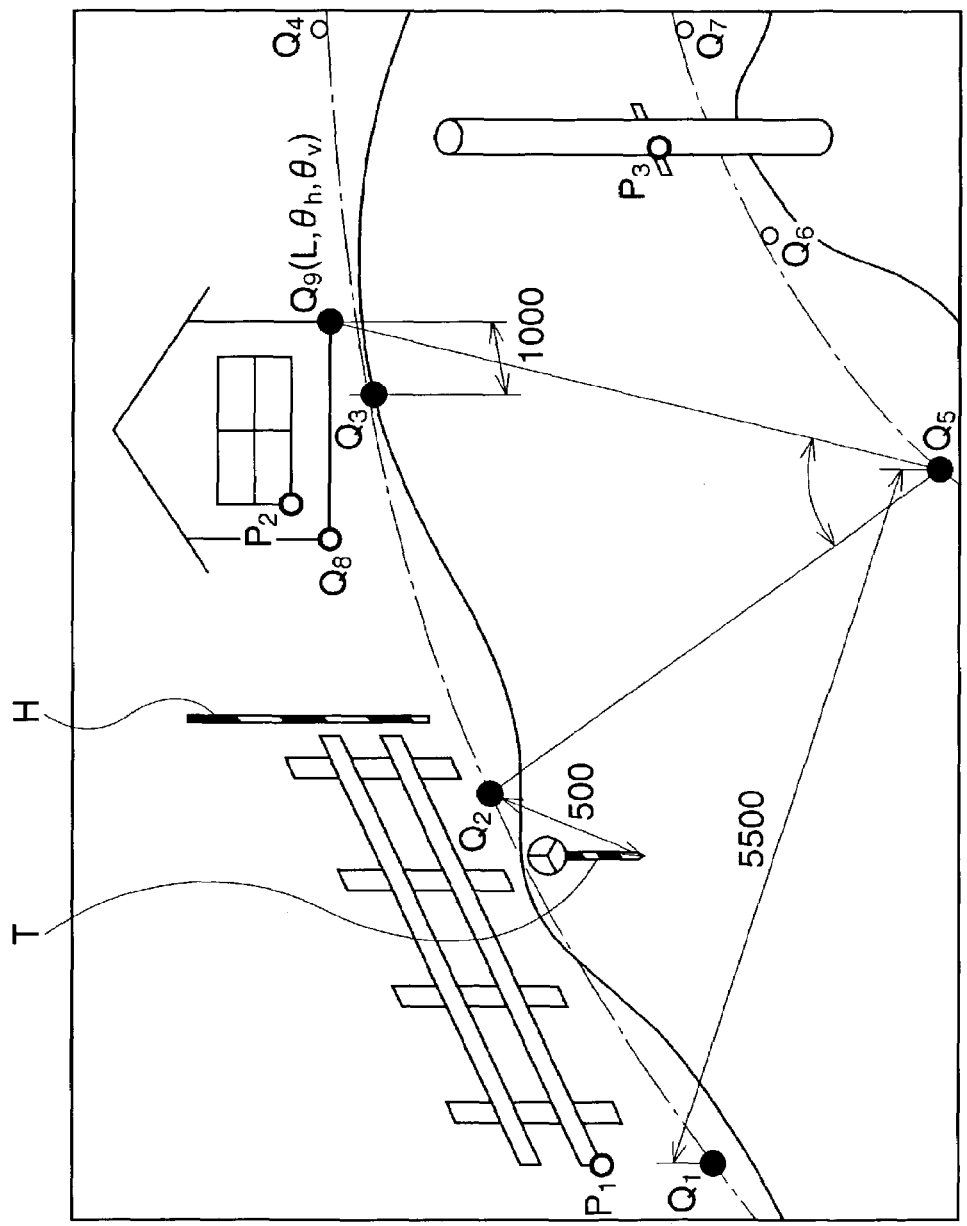
FIG. 10 schematically illustrates an example of image indication in the first mode surveying.

When the operator selects the first mode in Step S304, or when the first mode has already been selected, the process proceeds to Step S305. In Step S305, a plurality of measurement points to be measured during the surveying can be appointed (e.g. $Q_1$ to $Q_9$) on the schematic image by using the pointing device 30. The above appointed measurement points $Q_1$ to $Q_9$ are indicated on the schematic image by marks or symbols in order to discriminate each point from others, as shown in FIG. 10. Further, when operating a predetermined switch in the switch group 29 while the surveying instrument 101 is sighted on a target held by an assistant worker for surveying the position of the target, measurement data of the target is transmitted to the digital still camera 20 from the surveying instrument 10'. Thereby, a symbol T that indicates the target is superimposed on the schematic image at the point corresponding to the target. Further, when the surveying instrument 10' is provided with an automatic sighting mechanism, measurement of the target may be successively executed in turn at a predetermined interval so as to feed back the varying position of the target to the surveying instrument 10'. Thereby, the sight of the sighting telescope automatically follows the moving target and the current position of the target is constantly and properly indicated on the schematic image. Namely, the current sighting position and the movement of the sighting telescope can be monitored. Therefore, an operator can proceed with the surveying operations in reference to the position of the target and the position of the measurement point, which is to be measured, on the schematic image, to thereby facilitate the surveying operations.

Furthermore, when the surveying instrument is a non-prism type instrument, which enables surveying without a target, a symbol that represents the sighting position, for example a symbol "+" may be indicated on the schematic image in place of the symbol T. Namely, the symbol "+" is indicated at the position corresponding to the surveying position obtained by the continuous surveying which is successively carried out at a predetermined time interval. Thereby, the surveying operations can be guided by the indication symbol of the sighting position of the sighting telescope and its movement.

Further, when a previously measured measurement point or points (e.g. $Q_1$, $Q_2$, $Q_3$, $Q_5$, and $Q_9$) of which the position/s are already known, exist, the distance (e.g. 500) between a designated measurement point (previously known) and the target is indicated in a certain unit (e.g. mm) when one of the previously known measurement points is selected by the pointing device 30. Note that, the control points (e.g. $P_1$ to $P_3$), which are designated in Step S302, can also be indicated on the schematic image, so that a distance between the target T and a control point can be indicated on the schematic image.

In Step S306, the measurement for the measurement point sighted in Step S305 is carried out. When the measurement for the above measurement point ends, in Step S307, the mark (or symbol) of the measurement point on the schematic image is altered to a different mark (or symbol) so as to indicate the completion of the measurement. For example, white or empty circles ($Q_4$, $Q_6$, $Q_7$, and $Q_8$) represent measurement points still not measured, and black circles ($Q_1$, $Q_2$, $Q_3$, $Q_5$, and $Q_9$) represent measurement points already measured. For another example, the non-measured measurement points may be represented by triangles and the measured measurement points may be represented by circles. Further, any other kind of dissimilar set of marks or symbols can be used, as long as the non-measured and measured measurement points are distinguishable. Furthermore, data relating to the position of each measurement point or control point may be indicated beside each of the corresponding points. Examples of the attached data are surveying coordinates values, absolute coordinates values, oblique distance L, horizontal angle $\theta h$, altitude $\theta v$, and the like. Note that, when the position of a measurement point or control point is represented by the oblique distance, horizontal angle, and altitude, the base line (horizontal angle base line) H for measuring the horizontal angel $\theta h$ may be arbitrarily designated by the operator by using an input device, such as the pointing device 30.

In Step S308, a plurality of measured measurement points can be selected by using the pointing device 30, so that surveying values relating to the measurement data (secondary measurement information), such as the distance between the selected measurement points, an angle provided by three selected measurement points, an area defined by a polygon including three or more than three selected measurement points, the volume defined by a polyhedron including four or more than four selected measurement points, and the like, can be calculated and indicated on the display.

In Step S309, whether to terminate the surveying operations is defined. When a switch of the switch group 29 is operated so as to terminate the surveying operations, the process proceeds to Step S310. On the other hand, when the surveying operations are not terminated, the process returns to Step S304 and the processes in Step S304 and the following steps are repeated.

Figure 11:
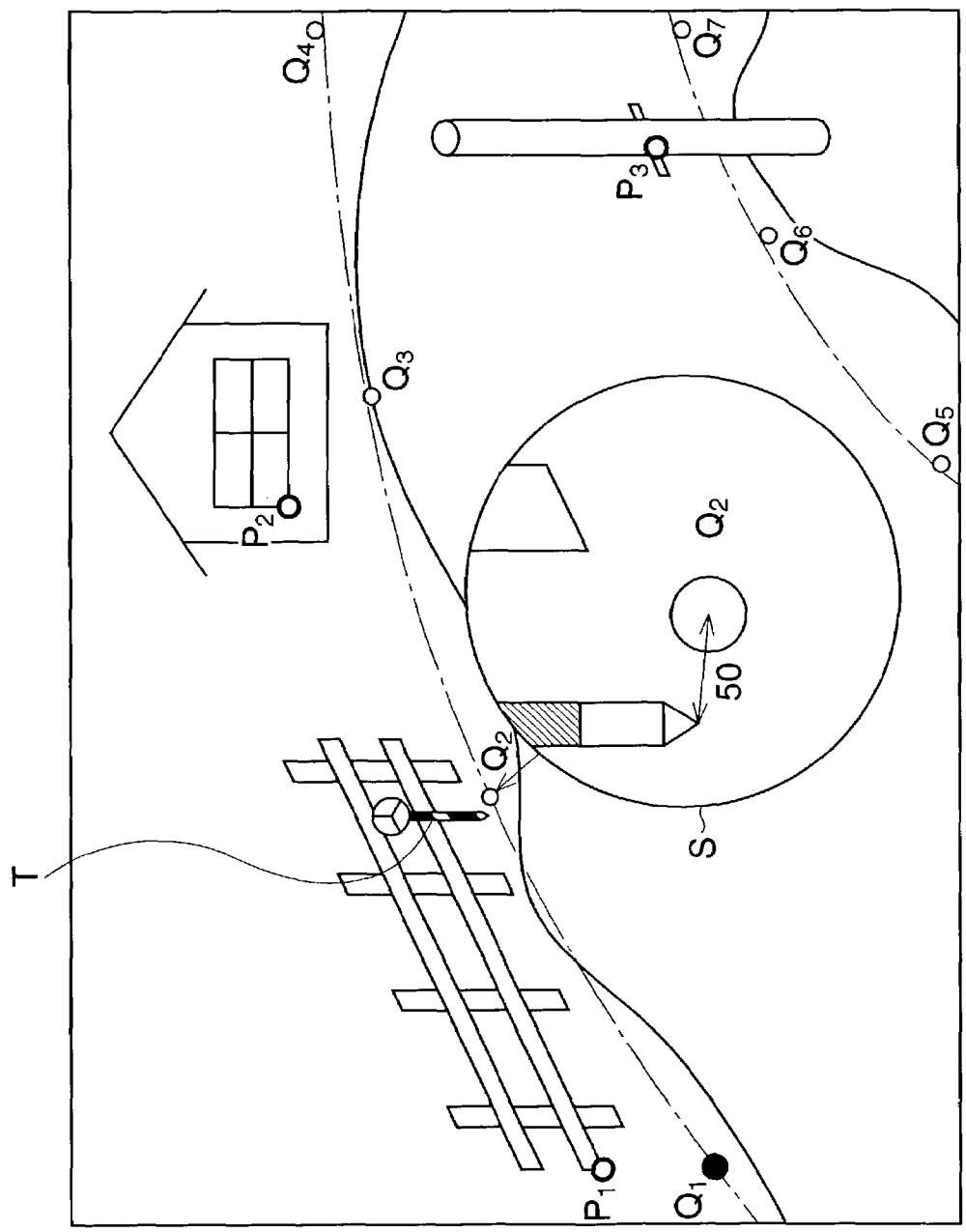
FIG. 11 schematically illustrates an example of image indication in the second mode surveying.

When the second mode is selected in Step S304, or when the second mode has already been selected, the process proceeds to Step S311 so that a magnified image S of the sighting direction is captured by the CCD 18 mounted inside the surveying instrument 10' and it is superimposed on the schematic image, as shown in FIG. 11. In Step S312, as well as Step S305, the sighting telescope is sighted on the target and the like with reference to the magnified image S and the schematic image obtained by the surveying instrument. The position which is sighted by the surveying instrument 10' is then measured in Step S306. Further, in Step S310, measurement data which are related to the position of a measurement point indicated on a schematic image and a magnified image captured by the surveying instrument are associated and recorded into a file in the recording medium 27. Thereby, the surveying operations of the present embodiment end.

Figure 12:
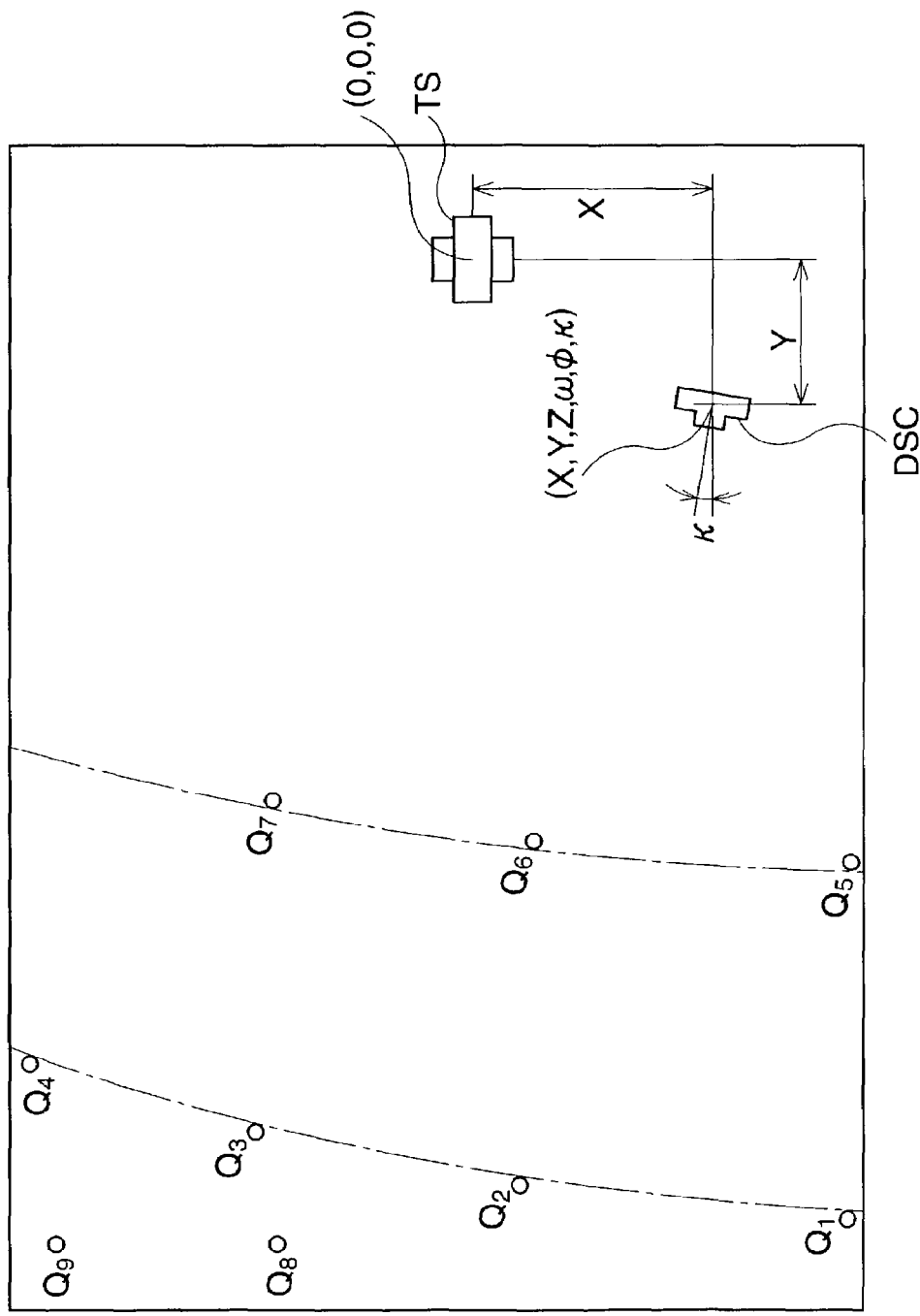
FIG. 12 schematically illustrates an example of image indication when the arrangement of measurement points, the surveying instrument, and the camera is displayed in a plan view.

Further, a mode for indicating the positions of the surveying instrument 10', the digital still camera 20, and the measurement points in a plan view on the display 24 may be provided, as described in FIG. 12. At this time, the plan view may be associated with the measurement data, schematic image data, and so on, and recorded in the recording medium 27

As described above, according to the third embodiment, effects similar to the first and second embodiment are obtained.

Next, with reference to FIGS. 13–15 and some of the figures prior to these, a surveying system of the fourth embodiment of the present invention will be described. Since the fourth embodiment is similar to the first embodiment, only those things that are dissimilar to the first embodiment will be explained. Note that, the components which are common with the first embodiment will be referred to by the same numerals.

Figure 13:
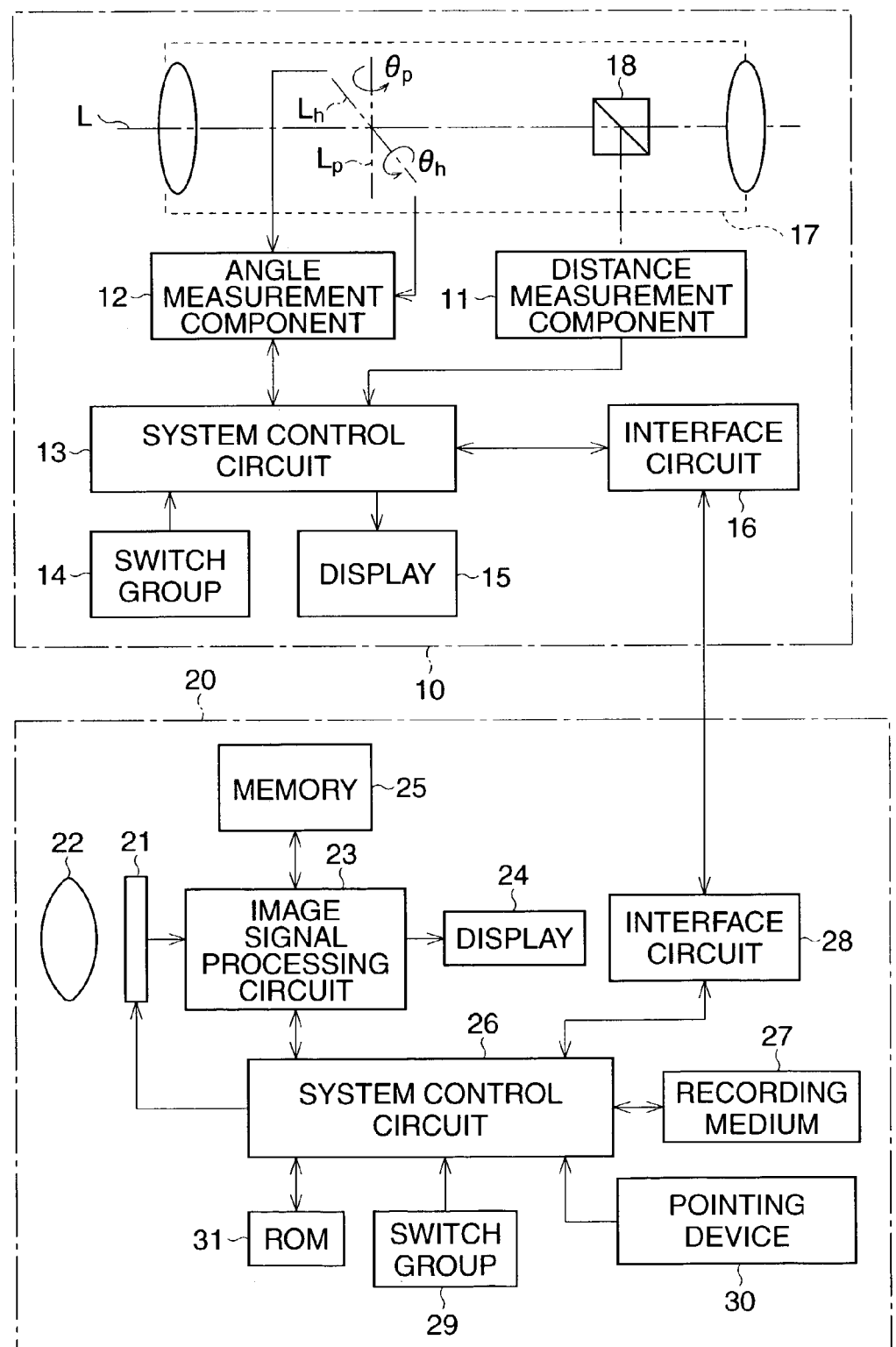
FIG. 13 is a block diagram showing a general electrical construction of the fourth embodiment of the present invention, which includes a surveying instrument and a camera.

FIG. 13 is a block diagram showing a general electrical construction of the fourth embodiment of the present invention, which includes a surveying instrument and a camera.

Any type of surveying instrument can be applied to the fourth embodiment as long as it can measure an angle. Examples of such instruments are a total station and a theodolite. In this explanation, the total station 10 of the first embodiment is adopted for the surveying instrument for convenience. Nevertheless, the same things can be said for the other types of surveying instruments. Note that, as well as in the first embodiment, the surveying instrument 10 is connected to the digital still camera 20.

In addition to FIG. 1, a schematic of the optical system of the surveying instrument 10 is shown in FIG. 13. The sighting telescope 17 of the surveying instrument comprises a horizontal axis Lh for measuring an altitude $\theta a$, and a vertical axis Lp for measuring a horizontal angle $\theta h$. Namely, the sighting telescope 17 is vertically rotatable about the horizontal axis Lh and horizontally rotatable about the vertical axis Lp. The horizontal axis Lh and the vertical axis Lp intersect at point $O_S$ (referred to as the sighting origin $O_S$ in the following) at a right angle. The optical axis L (or collimation line) of the sighting telescope 17 passes through the sighting origin $O_S$. The optical axis L is bifurcated by a half-mirror 18, so that one of the bifurcated optical axis reaches the eyepiece lens and the other reaches the distance measurement component 11. As described in the first embodiment, an oblique distance to a measurement point, and an altitude θa and a horizontal θh, are detected by using the distance measurement component 11 and the angle measurement component 12, respectively.

Figure 14:
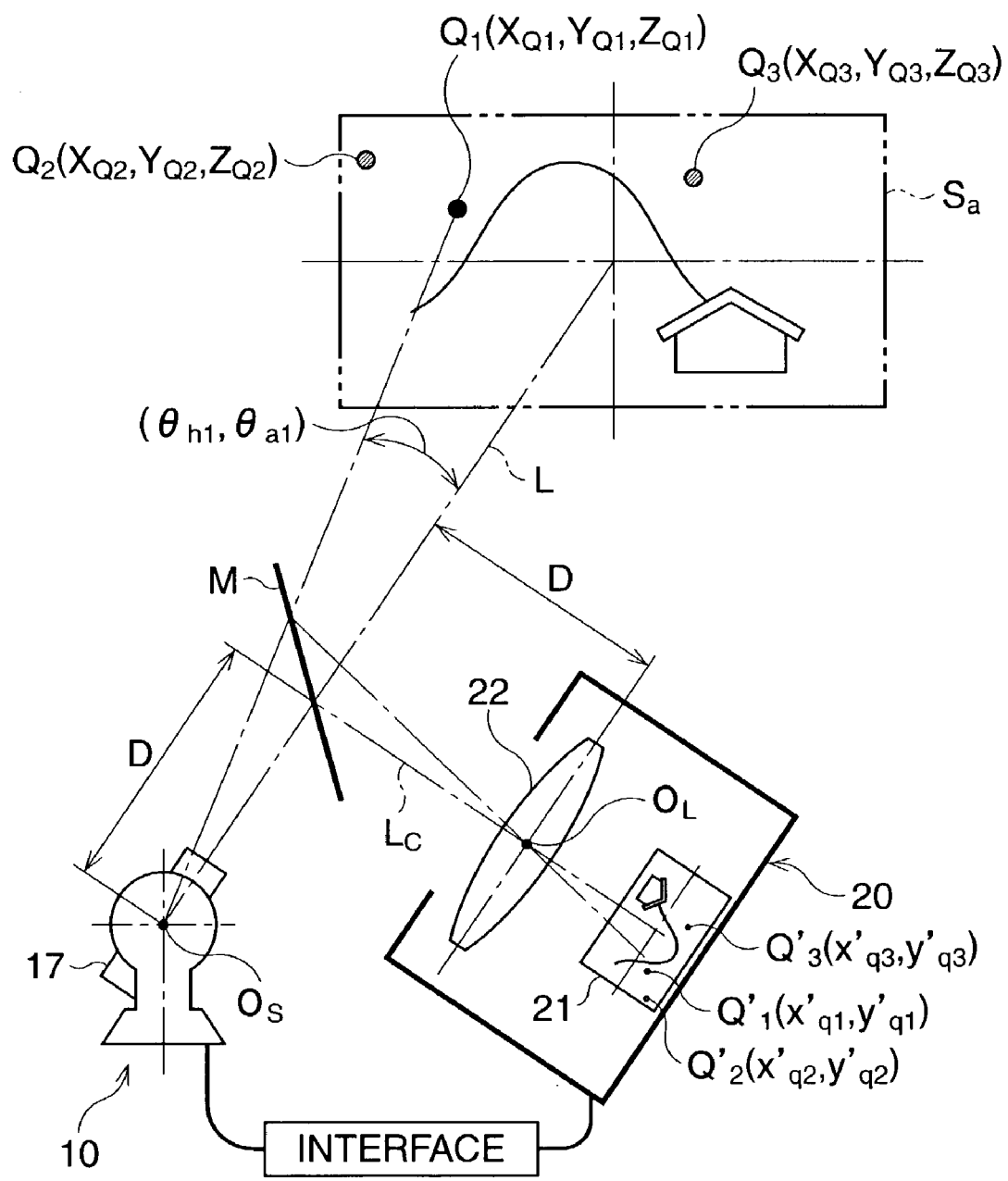
FIG. 14 schematically illustrates an arrangement of the surveying instrument and the camera in the fourth embodiment.
Figure 15:
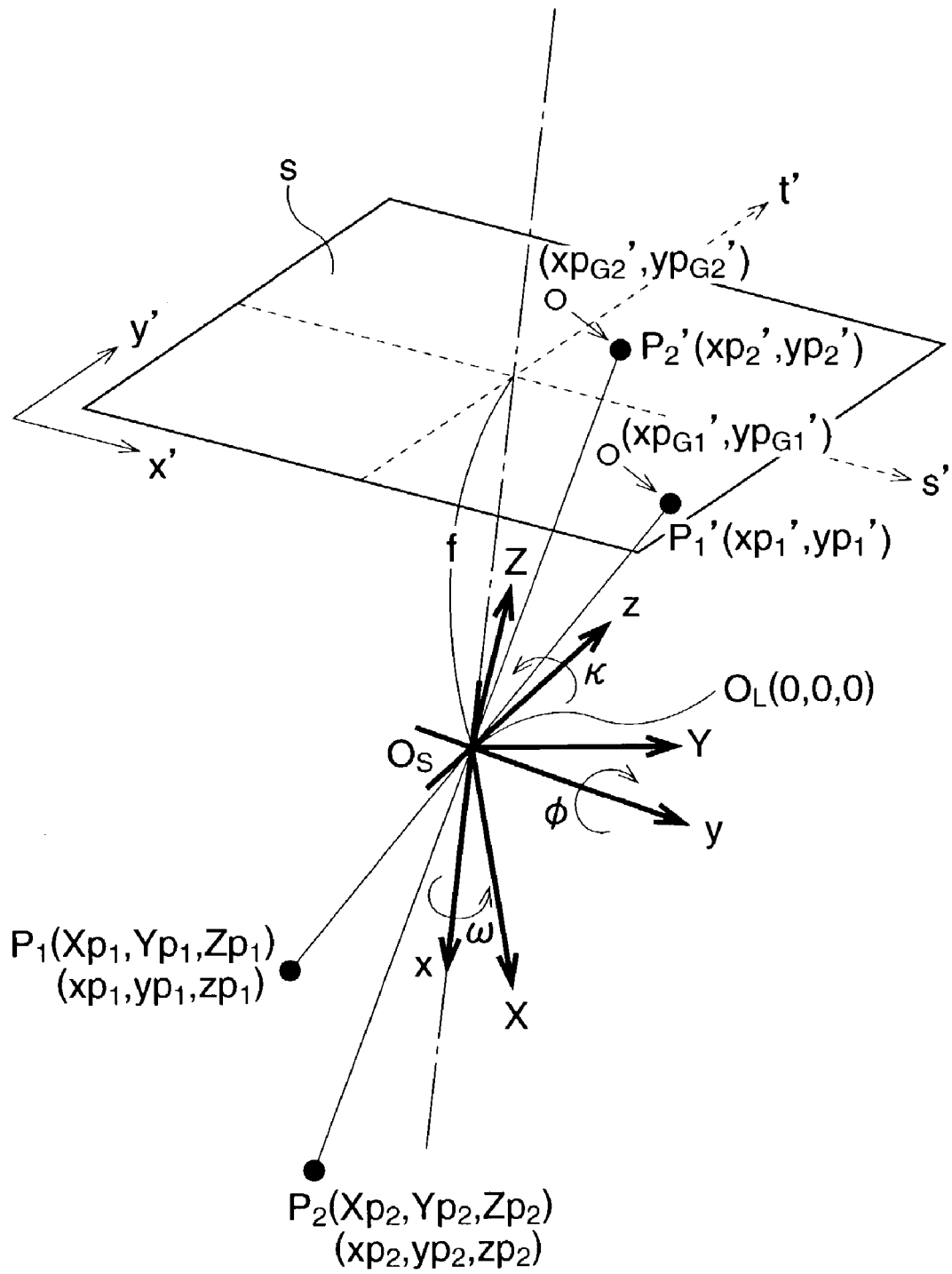
FIG. 15 schematically illustrates the relations between the sighting origin and the origin of the camera coordinate system, and the control points and the corresponding image points on the imaging surface S.

Referring to FIGS. 2, 13, and 14, a measurement point indicating process in the surveying system of the fourth embodiment will be explained. FIG. 14 schematically illustrates an arrangement of the surveying instrument and the camera.

As illustrated in FIG. 14, the digital still camera 20 is arranged at a position that is optically equivalent with the position of the surveying instrument 10. Namely, a beam splitter such as a half-mirror M is disposed across the optical axis L at a position distant from the sighting origin $O_s$ of the sighting telescope 17 at a distance "D". Further, the half-mirror M intersects with the optical axis L at a predetermined angle (e.g. 45°), so that the optical axis L is bifurcated to an optical axis Lc by the half-mirror M. The center of the lens or the center of the projection $O_L$ is also defined as the origin of the camera coordinate system, and is disposed on the optical axis Lc at a position distant from the intersection (bifurcation) of optical axes L and Lc on the half-mirror M, at the distance "D". Further, the optical axis Lc passes through the origin of the coordinates for the imaging device 21. In this optical structure, half of light rays from the subject pass through the half-mirror M, so that they are transmitted along the optical axis L and are made incident to the sighting telescope 17. The remaining half of the light rays are reflected by the half-mirror M, so that they are transmitted along the optical axis Lc and made incident to the photographing lens 22 of the digital still camera 20. As a result, the subject image is produced on the imaging surface of the imaging device 21 by the above reflected light rays incident to the photographing lens 22. Note that, in FIG. 14, an area Sa indicates a frame area to be captured by the digital still camera 20.

As well as in the first embodiment, the surveying operations are carried out based on the flowchart of FIG. 2. Namely, the surveying operation of the fourth embodiment is also started with the schematic image capturing operation of the survey field as Step S101 in the first embodiment. The control points are then designated on the schematic image in Step S102. The designated control points are then surveyed and correspondence between the surveying coordinates $(Xp_i, Yp_i, Zp_i)$ for each of the control points $P_i$, and the image coordinates $(xp_i', yp_i')$ for image points $P_i'$ are defined in Step S103. However, in the fourth embodiment, since the digital still camera 20 is arranged at the position that is optically equivalent with the surveying instrument 10, the number of unknown exterior orientation parameters is reduced. Therefore, the number of control points required for the exterior orientation is reduced to two. Consequently, in the fourth embodiment, only two control points $P_i$ (i=1,2) are designated.

Then in Step S104, the position and the inclination of the digital still camera, which is the exterior orientation parameters, are calculated by means of space resection. In the fourth embodiment, dissimilar to the first embodiment, the surveying coordinates $(Xp_i, Yp_i, Zp_i)$ of the control points $P_i$ are expressed by unit-distance three-dimensional coordinates (a predetermined surveying coordinate system) of which the origin is at the sighting origin $O_s$. Here, the unit-distance three-dimensional coordinates $(Xp_i, Yp_i, Zp_i)$ are coordinates representing an intersection between the unit sphere with its center at the sighting origin $O_s$ (origin of the surveying coordinate system) and a segment oriented to the sighting direction (collimation line). In the fourth embodiment, since the digital still camera 20 is arranged at a position that is optically equivalent with the surveying instrument 10, an arbitrary point on the collimation line is projected onto the same point on the imaging surface S, thus the coordinates of the above intersection are assumed as fictitious three-dimensional coordinates of a point which is sighted by the surveying instrument 10, and the space resection is carried out under this assumption. Note that, when the horizontal angle and the latitude from the base direction (e.g. X-axis) of the surveying instrument 10 are θh and θa, each of $Xp_i$, $Yp_i$, and $Zp_i$ is described as:

$Xp_i = \sin θh \cdot \cos θa$, $Yp_i = \sin θa$, $Zp_i = -\cos θh \cdot \cos θa$ In Step S104, the space resection is carried out in a way similar to the first embodiment. However, in the fourth embodiment, the digital still camera 20 is arranged at the position that is optically equivalent with the surveying instrument 10, that is, the center of lens (center of projection) $O_L$ is disposed at the position optically equivalent to the sighting origin $O_s$, so that the origin $O_L$ of the camera coordinate system can be regarded as the origin (sighting origin) $O_s$ of the surveying coordinate system, as shown in FIG. 15. Therefore, the coordinates $(X_O, Y_O, Z_O)$ of the origin $O_L$ of the camera coordinate system in the surveying coordinate system are equal to (0,0,0). Namely, in the fourth embodiment, the unknown exterior orientation parameters, which should be calculated in determining the collinearity condition between the image coordinates and the surveying coordinates, are (ω, φ, κ). As obvious from the above explanation, in the space resection procedure shown in FIG. 6, all of the variables $(X_{GO}, Y_{GO}, Z_{GO})$ and (δX, δY, δZ) are regarded as "0", in the fourth embodiment.

In Steps S105–S108, the operations which are the same as those in the first embodiment are repeatedly carried out until it is determined to terminate the surveying operations in Step S107.

As an example of an alternate embodiment for the surveying system of the fourth embodiment, the surveying operation may be executed in accordance with the steps of FIG. 4, as well as the alternate embodiment for the first embodiment. The difference from the previous alternate embodiment is that here the exterior orientation parameters $(X_O, Y_O, Z_O)$ are known while they are unknown in the previous alternate embodiment. Therefore, in this embodiment, the exterior orientation (the space resection) is carried out in the same way as in the fourth embodiment.

Note that, when an inner orientation (e.g. distortion correction) is required for the fourth embodiment and its alternate embodiment, it can be carried out in the same way as is well defined by the first embodiment.

As described above, according to the fourth embodiment of the present invention, a similar affect as in the first embodiment is obtained. Further, in the fourth embodiment, the unknown exterior orientation parameters are reduced, so that the space resection procedure is facilitated and shorten.

Note that, when the optical axis of the photographing lens 22 coincides with the optical axis Lc, the exterior orientation parameters φ and κ are "0" and the remaining unknown exterior orientation parameter is only the rotating angle ω, which is the rotation about the optical axis Lc. Therefore, the required number of control points is reduced to one. Further, when all of the exterior orientation parameters are known, the processes relating to the designation of the control points, the measurement of control points, and the space resection, are omitted. The position of a measurement point on the schematic image is directly calculated from the surveying coordinates of the measurement point by Eq. (1) and (2). Furthermore, when the optical axis of the photographing lens 22 coincides with the optical axis Lc, and when the y-axis of the camera coordinate system is arranged in parallel with the horizontal axis Lh of the surveying instrument 10, the surveying coordinate system and the camera coordinate system can be regarded as the same coordinate system. Therefore, the position $(xp_i', yp_i')$ of an image point $Q_i'$ that corresponds to any measurement point $Q_i$ within the schematic image can be directly obtained in the following form, when the measurement point $Q_i$ is sighted by the surveying instrument 10;

$$xp_i' = f \tan(\theta h_i - \theta h_O),$$

$$yp_i' = f \tan(\theta a_i - \theta a_O),$$

where $\theta h_O$, $\theta a_O$ are the horizontal angle and altitude at the initial sighting when the schematic image was captured, $\theta h_i$, $\theta a_i$ are the horizontal angle and altitude of the measurement point $Q_i$ which is measured, and f is the principal distance or focal length (if distortion correction is required, the inner orientation parameters are also used). In this case, measurement points can be indicated on the schematic image during the surveying operations from the moment when information of the initial sighting direction (horizontal angle $\theta h_O$ and altitude $\theta a_O$, the orientation of the surveying instrument 10 when the schematic image was captured) is transmitted to the digital still camera 20. Therefore, measurement information obtained by the surveying instrument and image information of a surveying field obtained by the camera are more easily and efficiently associated.

Figure 16:
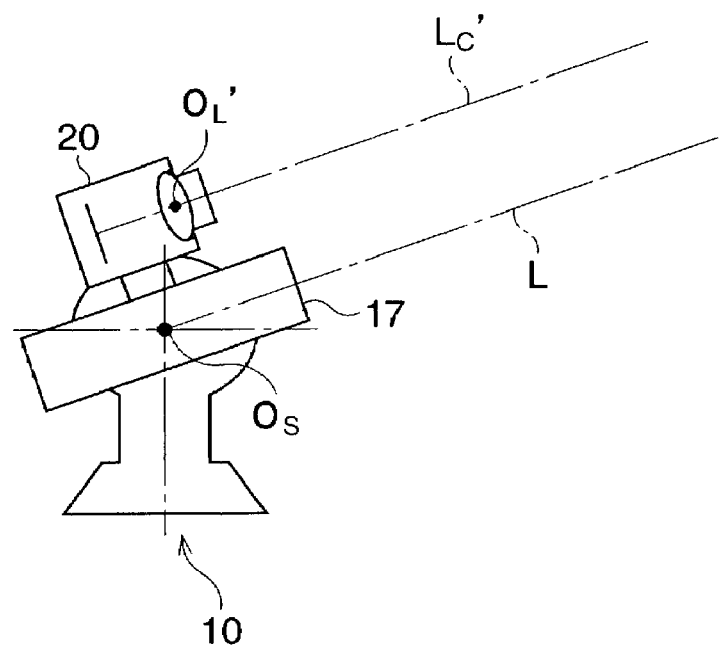
FIG. 16 schematically illustrates arrangement of the surveying instrument and the camera in the fifth embodiment when the optical axes of the surveying instrument and the camera are arranged in parallel.

Next, with reference to FIG. 16, a surveying system of the fifth embodiment of the present invention will be explained. FIG. 16 schematically illustrates the arrangement of the surveying instrument and the camera. Since the fifth embodiment is similar to the fourth (or first) embodiment, only those things which are dissimilar to the fourth (or first) embodiment will be explained. Note that, the components which are common with the previous embodiments will be referred to by the same numerals.

In the fourth embodiment, the center of lens $O_L$ (center of projection) can be regarded as if it is positioned at the sighting origin $O_S$ since the digital still camera 20 is positioned at the point optically equivalent to that of the surveying instrument 10. On the other hand, the center of lens $O_L'$ (center of projection) of the digital still camera 20 in the fifth embodiment is not physically disposed at the sighting origin $O_S$ nor the point optically equivalent to the sighting origin $O_S$. The center of lens $O_L'$ (center of projection) which corresponds to the origin of the camera coordinates is disposed at a predetermined position that is dissimilar to the sighting origin $O_S$ which corresponds to the origin of the surveying coordinates. Namely, at least one element of the coordinates $(X_O, Y_O, Z_O)$ of the origin $O_L'$ of the camera coordinate system in the surveying coordinate system is not "0". Further, in the fifth embodiment, the optical axis Lc' of the photographing lens 22 of the digital still camera 20 is arranged in parallel with the optical axis L of the sighting telescope 17 of the surveying instrument 10.

When the rotational angle ω about the optical axis Lc' (x-axis) of the digital still camera 20 is unknown, the unknown angle ω is obtained by substituting the matrix elements $T_{jk}$ with $\phi=0$ and $\kappa=0$, the surveying coordinates $(X_O, Y_O, Z_O)$ of the origin $O_L'$ of the camera coordinate system, and the both surveying coordinates and image coordinates for one control point into Eqs. (1) and (2). Thereby, the image coordinates $(xp_i', yp_i')$ of the image point $Q_i'$ is obtained from the surveying coordinates $(Xp_i, Yp_i, Zp_i)$ of the measurement point $Q_i$. Further, when the rotational angle ω is also previously known, the image coordinates $(xp_i', yp_i')$ of the image point $Q_i'$ is obtained by substituting the surveying coordinates $(Xp_i, Yp_i, Zp_i)$ of the measurement point $Q_i$ directly into Eq. (2), since all of the exterior orientation parameters $(X_O, Y_O, Z_O, \omega, \phi, \kappa)$ are known.

As it was described in the fourth embodiment or in the first embodiment, a mark that represents the measurement point $Q_i$ and/or measured values of the measurement point is indicated on the schematic image at the point corresponding to the measurement point $Q_i$ in accordance with the obtained image coordinates $(xp_i', yp_i')$ of the image point $Q_i'$ when the surveying instrument 10 is sighted onto the measurement point $Q_i$.

As described above, according to the fifth embodiment of the present invention, a similar effect as that in the fourth embodiment is obtained.

Figure 17:
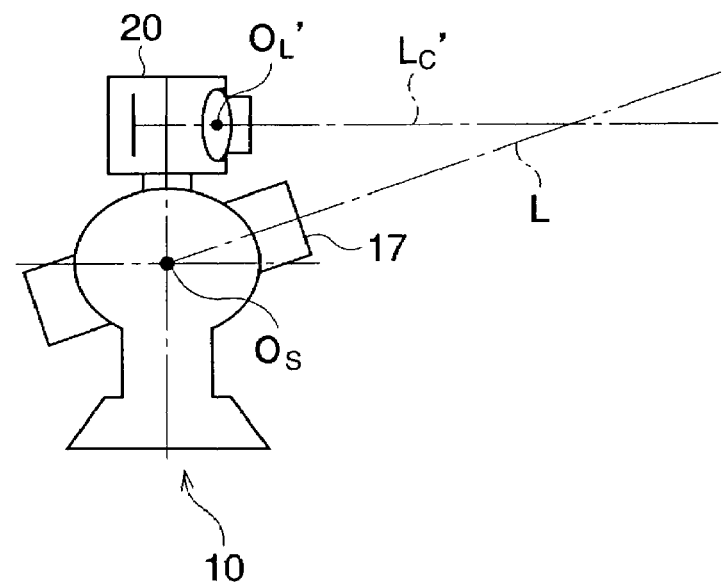
FIG. 17 schematically illustrates arrangement of the surveying instrument and the camera in the fifth embodiment when the optical axes of the surveying instrument and the camera intersect each other.

Note that, in the fifth embodiment, the optical axis Lc' is arranged in parallel with the optical axis L, however, the position of the image point on the schematic image for an arbitrary measurement point can be obtained as before, by using Eq. (2), even when the optical axis Lc' and the optical axis L intersect each other as shown in FIG. 17. Further, as well as in the second embodiment, a common digital still camera 20' on the market can be used for capturing a schematic image of a surveying area or the surveying field in the fourth and fifth embodiment. From the above combinations of the embodiments, the effect of the use of a common digital still camera in the second embodiment is additionally obtained for each of fourth and fifth embodiments.

Although in the present embodiments, the control points are arbitrarily designated on the schematic image by using a pointing device, it is also possible to capture an image of a reference scale of which the dimensions are known, or reference marks at arbitrary positions with in the schematic image, and to calculate the exterior orientation parameters by regarding them as the control points. In this case, the points on the reference scale or the reference marks may be designated on the schematic image by a pointing device or the like. Further, when the reference scale or the reference marks are applied the control points on the schematic image may be automatically detected by means of image processing.

In the present embodiments, a surveying instrument such as a total station and a theodolite are listed as examples, however, any surveying instrument that can measure the three-dimensional coordinates in a certain coordinate system can be applied, for example, a GPS may be used as the surveying instrument. Further in the fourth and fifth embodiment, any surveying instrument that can detect angular values can be used. Furthermore, the angular values are not restricted to an altitude and a horizontal angle, in fact any other type of angles may be used. For example, an angle produced between two arbitrary points in an oblique plane may be used.

In the second and fifth embodiments, the computer and the surveying instrument are separate, the computer system may be integrated with the surveying instrument.

Further in the present embodiments, measurement data are transmitted from a surveying instrument to a digital still camera or a computer through an interface circuit, the measurement data may be input by an operator to the camera or computer by using an input device such as a keyboard.

In the present embodiments, a digital still camera is adopted, however, any of device that can take a digital image is applicable, e.g. a digital video camera and the like.

Further, when a surveying instrument is provided with an incremental-type automatic sighting mechanism, angular values (e.g. altitude and horizontal angle) of the surveying instrument are detected all the time. On the other hand, when a surveying instrument is provided with an absolute-type automatic sighting mechanism, the angular values of the surveying instrument are detected each time when the rotation of the surveying instrument is stopped. Therefore, in the above surveying instruments, the symbol "+" may be indicated on the schematic image to guide the surveying at a predetermined time interval (continuously) or when the rotation of the surveying instrument is settled, at the angular positions which correspond to the angular values detected by the surveying instrument. Then the measurement point mark may be displayed at a position which is determined as a measurement point by an operation (using keyboard and the like).

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 2002-050800 (filed on Feb. 27, 2002), 2002-065380 (filed on Mar. 11, 2002), 2002-182948 (filed on Jun. 24, 2002), 2002-187277 (filed on Jun. 27, 2002), and 2002-187798 (filed on Jun. 27, 2002) which are expressly incorporated herein, by reference, in their entirety.

The invention claimed is:

1. A surveying system, comprising:
a position relation calculating processor that calculates a position relation between a coordinate system to which measurement information of a measurement point refers and a schematic image of a surveying field, in which said schematic image includes said measurement point; and
a correspondence obtaining processor that obtains a correspondence between said measurement information of said measurement point and position information of a point corresponding to said measurement point on said schematic image,
wherein said position relation is calculated from a position relation between measurement information of at least three arbitrary control points and position information of said control points on said schematic image.

2. A system according to claim 1, further comprising:
a surveying device configured to obtain said measurement information for said measurement point.

3. A system according to claim 2, further comprising:
an image indicating device that indicates said schematic image on a screen;
an input device that enables a designation of a point on said screen of said image indicating device; and
a measurement point indicating processor that indicates the position of a measurement point to be measured by said surveying device, on said schematic image when said measurement point is designated on said schematic image by said input device.

4. A system according to claim 1,
wherein said position relation between said coordinate system and said schematic image is represented by exterior orientation parameters which include a position and an inclination of a camera when said schematic image is captured.

5. A system according to claim 1, further comprising:
an image indicating device that indicates said schematic image on a screen; and
an input device that enables a designation of a point on said screen of said image indicating device;
wherein the positions of said control points are determined by designating arbitrary points on said schematic image by using said input device.

6. A system according to claim 1, further comprising:
an image indicating device that indicates said schematic image on a screen; and
a measurement point indicating processor that indicates the position of said measurement point on said schematic image indicated by said image indicating device, in accordance with said measurement information and said position information on said schematic image.

7. A system according to claim 6,
wherein at least one of said control points is designated from said measurement points which are already measured.

8. A system according to claim 6,
wherein at least one of said control points is given by three-dimensional position information of previously determined geographic position.

9. A system according to claim 6, further comprising:
a surveying device configured to obtain said measurement information for said measurement point;
wherein said correspondence obtaining processor obtains the correspondence between a position of a measurement point and position information of said measurement point on said schematic image so as to indicate said position on said schematic image by means of said measurement point indicating processor, when a measurement point is measured by said surveying device after the position relation calculating process is performed.

10. A system according to claim 6,
wherein measurement information relating to the position of said measurement point can be indicated on said schematic image at one of the positions where said measurement point is indicated on said schematic image by said measurement point indicating processor and a point adjacent to the position of said measurement point on the image.

11. A system according to claim 9,
wherein the position of a target for surveying is measured so that a mark that represents said target can be indicated on said schematic image at the position corresponding to said target.

12. A system according to claim 6, further comprising:
an input device that enables designation of a point on said screen of said image indicating device, and
wherein secondary measurement information that is derived from relative relations between a plurality of measurement points designated by said input device can be indicated on said schematic image.

13. A system according to claim 12,
wherein said secondary measurement information comprises a distance between said measurement points.

14. A system according to claim 12,
wherein said secondary measurement information comprises an angle between two segments which are defined by three of said measurement points.

15. A system according to claim 12,
wherein said secondary measurement information comprises an area that is defined by a polygon including at least three of said measurement points.

16. A system according to claim 12,
wherein said secondary measurement information comprises a volume that is defined by a polyhedron including at least four of said measurement points.

17. A system according to claim 1,
wherein at least one of the relations between the position of said measurement point, the position where said schematic image is captured, and the position of said surveying device is subjected to one of an indication operation and a recording operation, in a form of plan view.

18. A system according to claim 1, further comprising:
a data recording processor configured to associate and record said measurement information which relates to said measurement point and image data which relates to said schematic image.

19. A system according to claim 2,
wherein said surveying device comprises an image capturing device configured to capture a magnified image which has a higher magnification relative to said schematic image, and wherein said magnified image of a sighting direction of said surveying device can be indicated on said schematic image.

20. A system according to claim 1, further comprising:
a recording processor configured to record the correspondence between said measurement information and said position information on said schematic image, which is obtained by said correspondence obtaining processor.

21. A system according to claim 2,
wherein said surveying device comprises a distance measurement processor and an angle measurement processor, and said measurement information comprises an oblique distance and angular values.

22. A system according to claim 2,
wherein said surveying device comprises a distance measurement processor and an angle measurement processor, and said measurement information comprises coordinates that are calculated from the oblique distance and angular values for said measurement point.

23. A system according to claim 21,
wherein said angular values comprise a horizontal angle and an altitude.

24. A system according to claim 1, further comprising:
a digital camera for capturing said schematic image.

25. A digital camera, comprising:
an imaging device;
a position relation calculating processor that calculates a positional relation between a schematic image and a surveying instrument in accordance with two-dimensional position information of at least three control points on said schematic image of a surveying field, which is captured by said imaging device, and three-dimensional measurement information of said control points measured by said surveying instrument; and a correspondence obtaining processor that obtains correspondence between said measurement information of a measurement point measured by said surveying instrument, and said position information relating to the position on said schematic image which corresponds to said measurement point.

26. A digital camera according to claim 25, further comprising:
a data receiving device that receives data relating to said measurement information from said surveying instrument.

27. A digital camera according to claim 25, further comprising:
an image indicating device that indicates said schematic image on a screen; and
an input device that enables designation of an arbitrary point on said screen of said image indicating device;
wherein positions of said control points are defined by designating arbitrary points on said schematic image by said input device.

28. A digital camera according to claim 25, further comprising:
an image indicating device that indicates said schematic image on a screen; and
a measurement point indicating processor that indicates the position of an unmeasured measurement point on said schematic image which is indicated by said image indicating device, in accordance with said measurement information and said position information on said schematic image.

29. A digital camera according to claim 25, further comprising:
an image indicating device that indicates said schematic image on a screen; and
a measurement point indicating processor that indicates the position of a measured measurement point on said schematic image, which is indicated by said image indicating device, in accordance with said measurement information and said position information on said schematic image.

30. A surveying supporting device, comprising:
a position relation calculating processor that calculates the position relation between a coordinate system to which measurement information of a measurement point refers and a schematic image of a surveying field, in which said schematic image includes said measurement point; and
a correspondence obtaining processor that obtains a correspondence between said measurement information of said measurement point and position information of a point corresponding to said measurement point on said schematic image,
wherein said position relation calculating processor calculates a positional relation between a schematic image and a surveying instrument in accordance with two-dimensional position information of at least three control points on said schematic image of a surveying field, which is captured by said imaging device, and three-dimensional measurement information of said control points measured by said surveying instrument.

31. A device according to claim 30, further comprising:
a data receiving device that receives data relating to said measurement information from said surveying instrument.

32. A device according to claim 30, further comprising:
- an image indicating device that indicates said schematic image on a screen; and
- an input device that enables designation of a point on said screen of said image indicating device;
- wherein positions of said control points are determined by designating arbitrary points on said schematic image by using said input device.

33. A device according to claim 30, further comprising:
- an image indicating device that indicates said schematic image on a screen; and
- a measurement point indicating processor that indicates the position of said measurement point on said schematic image indicated by said image indicating device, in accordance with said measurement information and said position information on said schematic image.

34. A computer program product for supporting surveying, comprising:
- a positional relation calculation process that calculates positional relation between a schematic image of a surveying field including a measurement point and a surveying instrument; and
- a correspondence calculation process that calculates correspondence between measurement information of said measurement point, which is measured by said surveying instrument, and position information of the point corresponding to said measurement point on said schematic image,
- wherein said positional relation is calculated from a relation between measurement information of at least three arbitrary control points and position information of said control points on said schematic image.

* * * * *